(12) United States Patent
Wahid et al.

(10) Patent No.: US 12,739,944 B2
(45) Date of Patent: Sep. 15, 2026

(54) INSTALLATION OF WI-FI ACCESS POINTS WITH CELLULAR CONNECTION

(71) Applicant: Plume Design, Inc., Palo Alto, CA (US)

(72) Inventors: Ali Wahid, Atlanta, GA (US); Arun Kalmanje, Palo Alto, CA (US); Yoseph Malkin, San Jose, CA (US)

(73) Assignee: PLUME DESIGN, INC., Palo Alto, PA (US)

( * ) Notice: Subject to any disclaimer, the term of this patent is extended or adjusted under 35 U.S.C. 154(b) by 621 days.

(21) Appl. No.: 17/892,919

(22) Filed: Aug. 22, 2022

(65) Prior Publication Data

US 2024/0064866 A1 Feb. 22, 2024

(51) Int. Cl.

| | |
|---|---|
| ***H04W 4/00*** | (2018.01) |
| ***H04W 4/80*** | (2018.01) |
| ***H04W 88/04*** | (2009.01) |
| ***H04W 88/16*** | (2009.01) |

(52) U.S. Cl.

CPC ............. *H04W 88/04* (2013.01); *H04W 4/80* (2018.02); *H04W 88/16* (2013.01)

(58) Field of Classification Search

CPC ....... H04W 88/04; H04W 4/80; H04W 88/16; H04W 84/12

See application file for complete search history.

(56) References Cited

U.S. PATENT DOCUMENTS

| | | | |
|---|---|---|---|
| 10,178,578 B1 | 1/2019 | McFarland et al. | |
| 10,299,405 B2 | 5/2019 | Chang et al. | |
| 10,341,193 B2 | 7/2019 | Rengarajan et al. | |
| 10,431,868 B2 | 10/2019 | Samardzija et al. | |
| 10,431,869 B2 | 10/2019 | Samardzija et al. | |
| 10,433,194 B2 | 10/2019 | McFarland et al. | |
| 10,462,929 B1 | 10/2019 | Su et al. | |
| 10,554,733 B2 | 2/2020 | Edara et al. | |
| 10,687,227 B2 | 6/2020 | Rusackas et al. | |
| 10,777,877 B2 | 9/2020 | Su et al. | |
| 11,109,244 B2 | 8/2021 | Rengarajan et al. | |
| 11,398,946 B2 | 7/2022 | Rengarajan et al. | |
| 2004/0248593 A1* | 12/2004 | Hicks, III ......... | H04M 3/42263 455/462 |
| 2015/0365833 A1* | 12/2015 | Stafford ................ | H04W 24/02 370/252 |

(Continued)

FOREIGN PATENT DOCUMENTS

| | | |
|---|---|---|
| CA | 3016072 A1 | 9/2017 |
| CA | 3083495 A1 | 10/2019 |

(Continued)

*Primary Examiner* — Omoniyi Obayanju

(74) *Attorney, Agent, or Firm* — Nicholas Martin; Greenberg Traurig, LLP

(57) ABSTRACT

Systems and methods of installing a cellular gateway in a Wi-Fi network include obtaining a cellular gateway that is configured to provide cellular connectivity to the Internet for an associated Wi-Fi network; measuring a plurality of locations in a building for the Wi-Fi network; and receiving an indication based on the measuring, on a mobile device, for locating the cellular gateway in the building. The mobile device can execute at least one of a mobile application and a browser session and communicates with the cellular gateway via any of Bluetooth and Wi-Fi.

19 Claims, 13 Drawing Sheets

(56) References Cited

U.S. PATENT DOCUMENTS

| | | | | |
|---|---|---|---|---|
| 2017/0094541 | A1* | 3/2017 | Ngai | H04W 24/08 |
| 2017/0272317 | A1 | 9/2017 | Singla et al. | |
| 2017/0272965 | A1 | 9/2017 | Kumar et al. | |
| 2018/0249341 | A1* | 8/2018 | Park | H04W 24/10 |
| 2019/0171259 | A1 | 6/2019 | McFarland et al. | |
| 2020/0358196 | A1 | 11/2020 | Samardzija et al. | |
| 2021/0029559 | A1 | 1/2021 | Agarwal et al. | |
| 2021/0105639 | A1 | 4/2021 | McFarland | |
| 2021/0151875 | A1 | 5/2021 | Samardzija et al. | |
| 2021/0195441 | A1 | 6/2021 | Agarwal et al. | |
| 2021/0195442 | A1 | 6/2021 | Agarwal et al. | |
| 2021/0195443 | A1 | 6/2021 | Agarwal et al. | |
| 2021/0257733 | A1 | 8/2021 | Samardzija et al. | |
| 2022/0102860 | A1 | 3/2022 | Samardzija et al. | |
| 2022/0132400 | A1 | 4/2022 | Agarwal et al. | |

FOREIGN PATENT DOCUMENTS

| | | | |
|---|---|---|---|
| EP | 3985939 | A1 | 4/2022 |
| WO | 2019213513 | A1 | 11/2019 |
| WO | 2019226428 | A1 | 11/2019 |
| WO | 2019236523 | A1 | 12/2019 |
| WO | 2021071627 | A1 | 4/2021 |
| WO | 2021092548 | A1 | 5/2021 |

* cited by examiner

DATA STORE 208
DATA STORE 208
200
PROCESSOR 202
I/O INTERFACES 204
NETWORK INTERFACE 206
212
DATA STORE 208
MEMORY 210
OPERATING SYSTEM (OS) 214
PROGRAM(S) 216

INSTALLATION OF WI-FI ACCESS POINTS WITH CELLULAR CONNECTION

FIELD OF THE DISCLOSURE

The present disclosure generally relates to wireless networking systems and methods. More particularly, the present disclosure relates to systems and methods for Wi-Fi networks with cellular connectivity, such as Wi-Fi network failover to cellular connection with throttling of traffic, installation of Wi-Fi access points with cellular connection, Geographic limitation of Wi-Fi access points with cellular connection, selecting and controlling base stations for Wi-Fi access points with cellular connection, and frequency planning for Wi-Fi access points with cellular connection.

BACKGROUND OF THE DISCLOSURE

Wi-Fi networks (i.e., wireless local area networks (WLAN) based on the IEEE 802.11 standards) are ubiquitous. In fact, Wi-Fi is the most common technique for user device connectivity, and the applications that run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The vast majority of connected devices use Wi-Fi for their primary network connectivity. As such, there is a need to ensure applications run smoothly over Wi-Fi. There are various optimization techniques for adjusting network operating parameters such as described in commonly assigned U.S. patent application Ser. No. 16/032,584, filed Jul. 11, 2018, and entitled "Optimization of distributed Wi-Fi networks," the contents of which are incorporated by reference herein.

Wi-Fi is continuing to evolve with newer generations of technology, including IEEE 802.11a, 802.11b, 802.11g, 802.11n, 802.11ac, and 802.11ax (referred to as Wi-Fi 6/6E), and future Wi-Fi 7. Each generation of technology evolves the Wi-Fi Media Access Control (MAC) and Physical (PHY) layers to add more capabilities. In the case of IEEE 802.11 ax, orthogonal frequency-division multiple access (OFDMA) has been added as a technique aimed at improving the efficiency of Wi-Fi communication when many small packets are being transmitted to or from multiple client devices. OFDMA can operate both in the downlink (one access point communicating simultaneously to multiple clients), or in the uplink (multiple clients communicating simultaneously to a single access point).

Traditionally, a Wi-Fi network includes at least one access point with a wired connection that connects to a gateway, such as a cable modem, a digital subscriber loop (DSL) modem, and the like, for connectivity to a wide area network (WAN), i.e., the Internet. However, fifth generation (5G) cellular deployments are proliferating. 5G offers an opportunity for high-speed wireless access to the WAN, providing various opportunities for service providers to offer fixed wireless access, backup for any cable modem or DSL connection, and the like. That is, future deployments will consider Wi-Fi access points with wireless WAN interfaces, such as via 5G.

With the introduction of wireless WAN interfaces in Wi-Fi networks and access points, there are various areas to address.

BRIEF SUMMARY OF THE DISCLOSURE

The present disclosure relates to systems and methods for Wi-Fi networks with cellular connectivity, such as Wi-Fi network failover to cellular connection with throttling of traffic, installation of Wi-Fi access points with cellular connection, Geographic limitation of Wi-Fi access points with cellular connection, selecting and controlling base stations for Wi-Fi access points with cellular connection, and frequency planning for Wi-Fi access points with cellular connection. Again, conventionally, Wi-Fi access points connect to a gateway device such as a cable modem, DSL modem, etc. The present disclosure contemplates the addition of a cellular connection, such as for a backup to a broadband connection, as a primary connection, and the like.

Variously, the present disclosure includes a method having steps, a cloud service implemented on servers, clusters, or the like, with the cloud service configured to implement the steps, as instructions stored in a non-transitory computer-readable medium where the instructions, when executed, cause one or more processor to perform the steps.

In an embodiment, the present disclosure includes Wi-Fi network failover to a cellular connection with throttling of traffic having steps of detecting an outage on wired connections for any of the plurality of Wi-Fi networks; determining the any of the plurality of Wi-Fi networks have switched to a cellular connection as a failover based on the outage; and determining whether to throttle traffic on any cellular connection based on the failover and instructing corresponding gateways accordingly. The traffic can be throttled based on any of specific applications and specific uses. The traffic can be throttled based on virtual or conceptual local networks that are operational in the plurality of Wi-Fi networks and that have different priorities. The determining whether to throttle traffic can be based on any of the outage and the failover being above a certain number of Wi-Fi networks. The determining whether to throttle traffic can be based on feedback from a cellular control plane to the cloud service. The determining whether to throttle traffic can be based on a subscription of associated users of the plurality of Wi-Fi networks. The steps can include steering the corresponding gateways to different base stations to limit a load on any given base station. The steps can include receiving information from the corresponding gateways related to the cellular connection including an identification of a corresponding base station. The steps can include receiving information from the corresponding gateways related to the cellular connection including an identification of visible base stations; and steering the corresponding gateways to different base stations. The traffic can be throttled based on assigning the traffic to different types of cellular connections including 4G or 5G. The steps can include receiving advertisements from the any of the plurality of Wi-Fi networks based on different cellular band capabilities; and instructing the corresponding gateways based on the different cellular band capabilities.

In another embodiment, the present disclosure includes installing a cellular gateway in a Wi-Fi network via steps of obtaining a cellular gateway that is configured to provide cellular connectivity to the Internet for an associated Wi-Fi network; measuring a plurality of locations in a building for the Wi-Fi network; and receiving an indication based on the measuring, on a mobile device, for locating the cellular gateway in the building. The mobile device can execute at least one of a mobile application and a browser session and communicates with the cellular gateway via any of Bluetooth and Wi-Fi. The measuring can be performed by the mobile device configured as a sensor, such that a user physically moves the mobile device to the plurality of locations. The cellular connectivity of the cellular gateway and the mobile device can be on different frequency bands with a correction factor used to adjust a measurement by the mobile device to reflect a value for the cellular gateway. The cellular connectivity of the cellular gateway and the mobile device can be with a same network provider. The cellular connectivity of the cellular gateway and the mobile device can be with a different network provider, with the mobile device forced into a roaming mode. The cellular connectivity of the cellular gateway and the mobile device can be with a different network provider, and the steps can include replacing a subscriber identity module (SIM) from the cellular gateway into the mobile device, prior to the measuring. The measuring can be performed by an installation sensor device provided with the cellular gateway. The measuring can be performed by the cellular gateway with one of a portable power bank and a laptop connected thereto. The cellular gateway can further include wired connectivity to the Internet and the plurality of locations include ones in the building supporting the wired connectivity. The Wi-Fi network can include a plurality of access points with the cellular gateway connected to one access point and a wired gateway connected to a different access point. The steps can further include providing results of the measuring to a cloud service. The steps can further include utilizing the results by the cloud service for any of analytics, development of heuristics, and providing advice or guidance to users. The mobile device can execute one of a mobile application and a browser session, and wherein the indication can be provided via the one of the mobile application and the browser session. The indication can be at least one of bars, a number, and/or a phrase.

In a further embodiment, the present disclosure includes geographically limiting a cellular gateway for a Wi-Fi network via steps of obtaining a location of the cellular gateway; determining whether the cellular gateway is authorized to operate at the location on a given cellular network; and performing an action including any of blocking, allowing, or partially allowing operation of the cellular gateway on the cellular network. The process can be implemented by a cloud service, and wherein the location is determined by one of the cellular gateway and a user device connected to the cellular gateway. The user device can be configured to provide the location to the cloud service via a separate network from the Wi-Fi network. The location can be determined via a user device connected to the cellular gateway with the user device having a global positioning satellite (GPS) antenna configured to determine the location, and wherein the user device includes one of an application and a browser configured to provide the location. The user device can connect to the cellular gateway via any of Bluetooth and Wi-Fi. The location can be determined by cellular infrastructure in the given cellular network. The location can be based on which cellular base station the cellular gateway is connected or based on triangulation via a plurality of cellular base stations. The action can be performed locally at the cellular gateway. The action can be performed in one of a cloud system and the given cellular network. Whether the cellular gateway is authorized to operate at the location can be based on planning by a network operator. The action can further include allowing temporarily and then blocking, providing a notification of a user of the Wi-Fi network, allowing temporarily and then disconnecting the cellular gateway, allowing temporarily and then only allowing the cellular gateway to communicate with a cloud service, and only allowing the cellular gateway to communicate with a cloud service.

In a further embodiment, the present disclosure includes selecting and controlling base stations for connectivity to a cellular gateway for a Wi-Fi network via steps of obtaining information related to a cellular infrastructure of a cellular network; determining a list of preferred cellular identifiers, each identifying a cell for connectivity with the cellular gateway, based on a plurality of factors; and providing the list of preferred cellular identifiers to the cellular gateway where the cellular gateway utilizes the list for wireless access to the cellular infrastructure. The steps can include periodically updating the list of preferred cellular identifiers and providing the list of preferred cellular identifiers to the cellular gateway, based on changes in any of the plurality of factors. The plurality of factors can include available bandwidth in the cellular infrastructure, network congestion, network performance, maintenance work on the cellular infrastructure, and network outages. The information can be obtained from one or more databases managed by a network operator of the cellular network. The obtaining can include triggering active probe tests by the cellular gateway including any of speed tests, latency measurements, jitter measurements, and packet loss measurements. The obtaining can include consolidating results of the active probe tests with results from other devices; and determining load on the cellular infrastructure based on the consolidated results. The steps can include, subsequent to the cellular gateway connecting to a preferred cell, causing modification of a connection between the cellular gateway and the preferred cell, for improvement of the connection. The modification can include any of changing signal strength, changing a buffer status report, changing a power headroom report, and changing multiple input multiple output of the cellular gateway. The modification can include any of manipulating quality of service (QoS) class identifier, manipulating statistics from the cellular gateway, and altering a capability report from the cellular gateway.

In a further embodiment, the present disclosure includes a process of frequency planning for a cellular gateway in a Wi-Fi network via steps of connecting to cellular infrastructure at a cellular frequency; providing a Wi-Fi connection at a Wi-Fi frequency selected to coexist with the cellular frequency; and, responsive to interference between the cellular frequency and the Wi-Fi frequency, performing one or more actions to reduce the interference. The Wi-Fi frequency selected to coexist with the cellular frequency can be predetermined based on any of field measurements and lab measurements. The Wi-Fi frequency selected to coexist with the cellular frequency can be determined based on a channel selection process with weighting factors on Wi-Fi frequencies that are based on how well they work with the cellular frequency. The cellular frequency can be fixed and the Wi-Fi frequency is selected based on the fixed cellular frequency. The one or more actions can include any of changing a transmit port over the Wi-Fi frequency and changing a modulation coding scheme of Wi-Fi signals over the Wi-Fi frequency. The one or more actions can include interacting with the cellular infrastructure to manipulate the cellular frequency. The one or more actions can include scheduling transmissions over the Wi-Fi frequency to avoid interference with the cellular frequency. The one or more actions can include manipulating listen before talk thresholds on the Wi-Fi frequency to defer transmissions over the Wi-Fi frequency when the cellular frequency is active. The Wi-Fi network can include the cellular gateway and one or more additional access points. The one or more additional access points can be configured to use request to send (RTS)/clear to send (CTS) to reduce the interference. Wi-Fi clients can be steered to the one or more additional access points from the cellular gateway.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Wi-Fi networks with cellular connectivity, such as Wi-Fi network failover to cellular connection with throttling of traffic, installation of Wi-Fi access points with cellular connection, Geographic limitation of Wi-Fi access points with cellular connection, selecting and controlling base stations for Wi-Fi access points with cellular connection, and frequency planning for Wi-Fi access points with cellular connection. Again, conventionally, Wi-Fi access points connect to a gateway device such as a cable modem, DSL modem, etc. The present disclosure contemplates the addition of a cellular connection, such as for a backup to a broadband connection, as a primary connection, and the like.

§ 1.0 Wi-Fi Network Topologies

Figure 1:
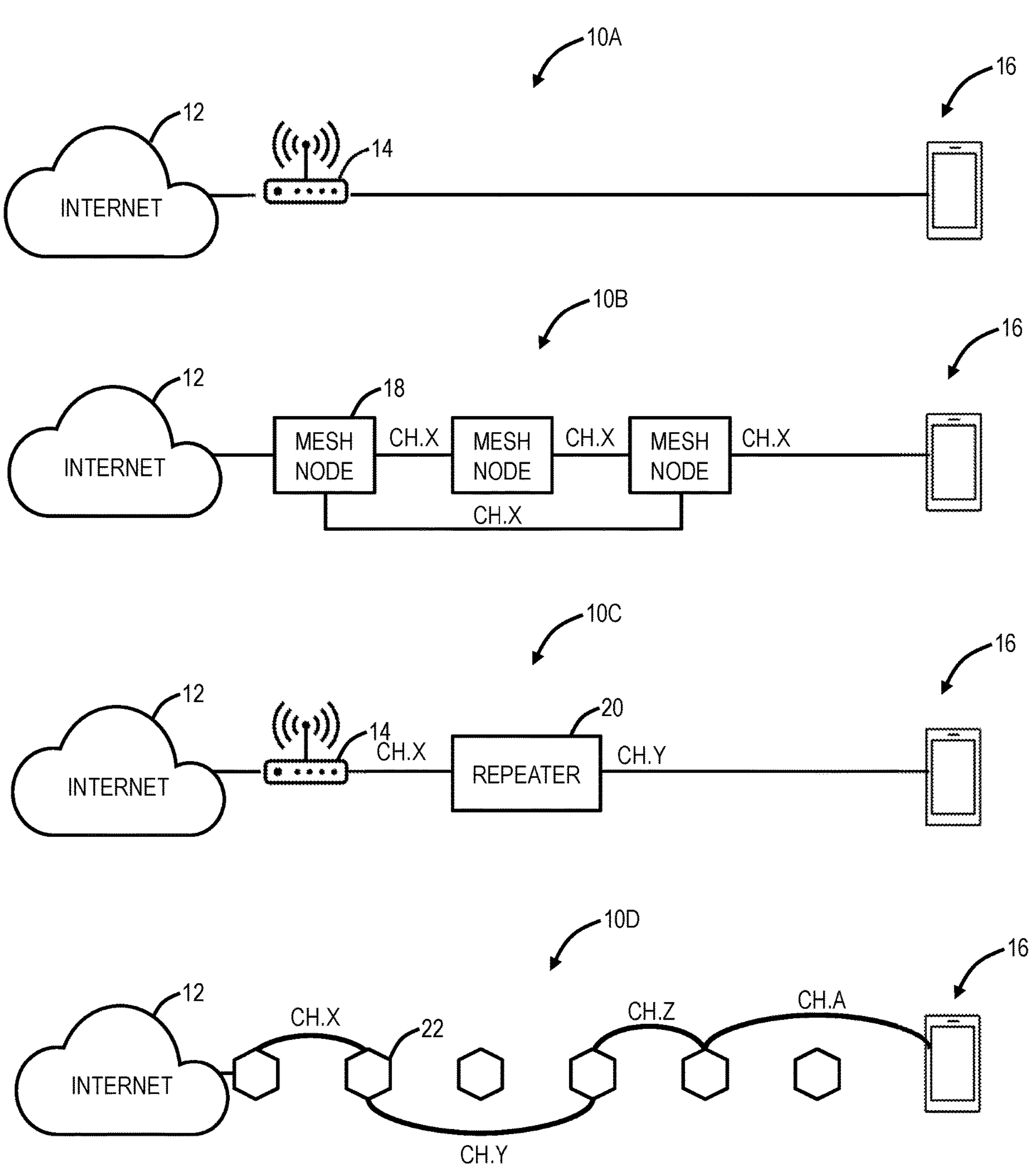
FIG. 1 is a network diagram of various Wi-Fi network topologies for connectivity to the Internet.

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only ⅓ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high-definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems, as illustrated in the Wi-Fi networks 1A, 10B, 10C. The first approach (the Wi-Fi network 10A) is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location, as illustrated in the Wi-Fi networks 10B, 10C. This approach is a fundamentally better approach to achieving better coverage. By placing even a single repeater 20 in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters 20. A fully interconnected mesh adds the ability for all the mesh nodes 18 to be able to communicate with each other, opening the possibility of packets being delivered via multiple hops following an arbitrary pathway through the network.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

§ 1.1 Cloud-Based Control

Figure 2A:
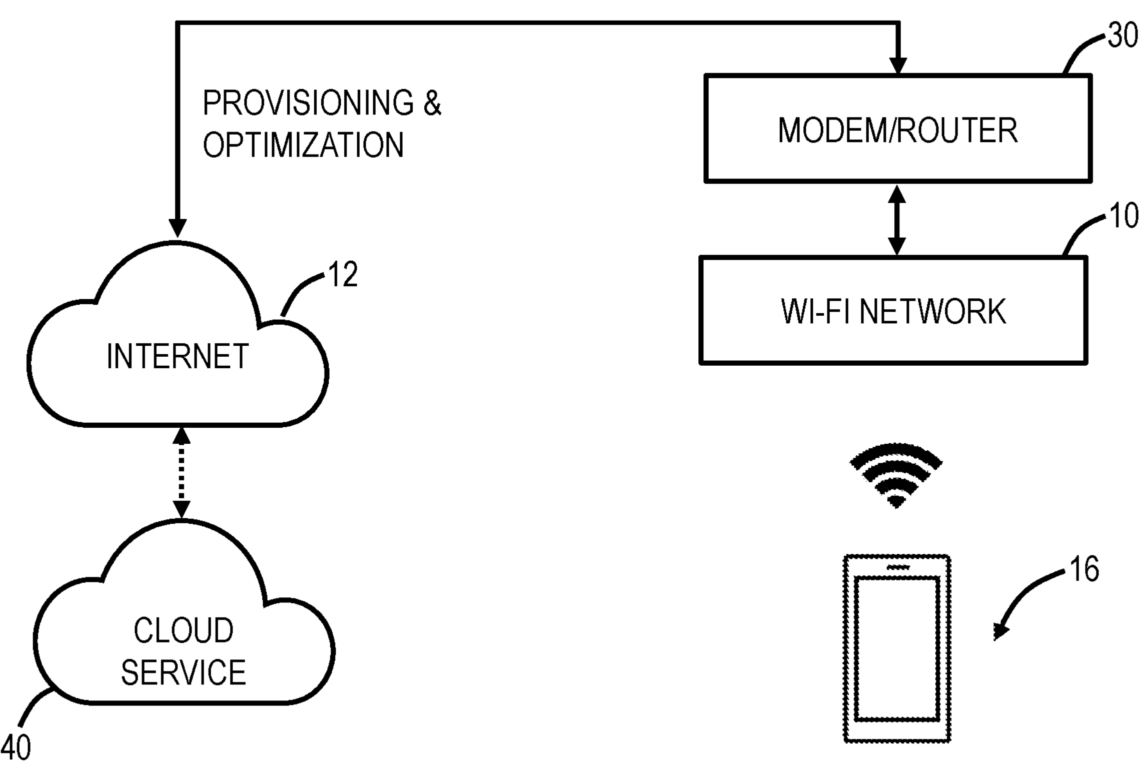
FIG. 2A is a network diagram of the Wi-Fi network with cloud-based control.

FIG. 2A is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected Wi-Fi client devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

§ 1.2 Distributed Wi-Fi Network

Figure 2B:
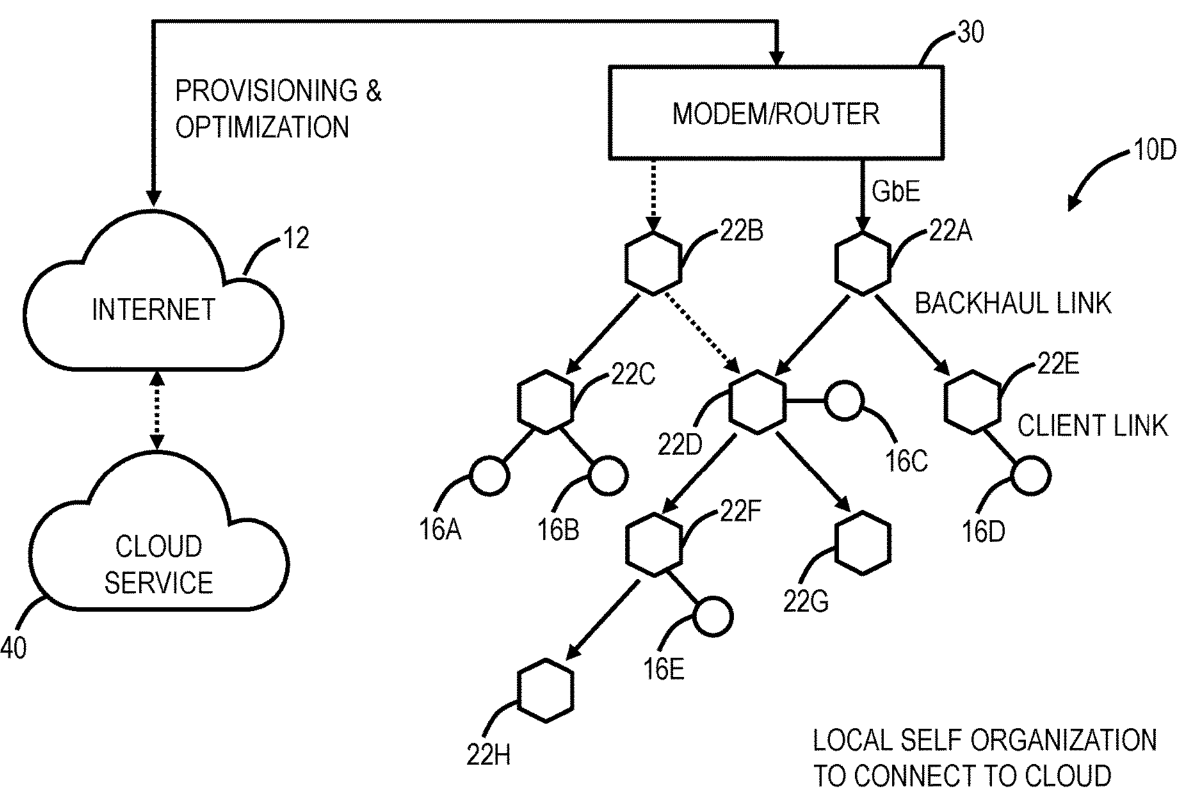
FIG. 2B is a network diagram of an example implementation of the Wi-Fi network, as a distributed Wi-Fi network in a tree topology.

FIG. 2B is a network diagram of an example implementation the Wi-Fi network 10D, as a distributed Wi-Fi network in a tree topology. The distributed Wi-Fi network 10D includes a plurality of access points 22 (labeled as access points 22A-22H) which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any Wi-Fi client device 16 needing Wi-Fi service. That is, an objective of the distributed Wi-Fi network 10D is for distances between the access points 22 to be of similar size as distances between the Wi-Fi client devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a client device 16. That is, in an exemplary aspect, the distributed Wi-Fi network 10D includes cloud-based control (with a cloud-based controller or cloud service) to optimize, configure, and monitor the operation of the access points 22 and the Wi-Fi client devices 16. This cloud-based control is contrasted with a conventional operation which relies on a local configuration such as by logging in locally to an access point. In the distributed Wi-Fi network 10D, the control and optimization does not require local login to the access point 22, but rather the Wi-Fi client device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2B, the access point 22A has an exemplary gigabit Ethernet (GbE) wired connection to the modem/router 40. Optionally, the access point 22B also has a wired connection to the modem/router 40, such as for redundancy or load balancing. Also, the access points 22A, 22B can have a wireless connection to the modem/router 40. Additionally, the access points 22A, 22B can have a wireless gateway such as to a cellular provider as is described in detail herein. The access points 22 can have wireless links for client connectivity (referred to as a client link) and for backhaul (referred to as a backhaul link). The distributed Wi-Fi network 10F differs from a conventional Wi-Fi mesh network in that the client links and the backhaul links do not necessarily share the same Wi-Fi channel, thereby reducing interference. That is, the access points 22 can support at least two Wi-Fi wireless channels—which can be used flexibly to serve either the client link or the backhaul link and may have at least one wired port for connectivity to the modem/router 40, or for connection to other devices. In the distributed Wi-Fi network 10D, only a small subset of the access points 22 require direct connectivity to the modem/router 40 with the non-connected access points 22 communicating with the modem/router 40 through the backhaul links back to the connected access points 22A, 22B. Of course, the backhaul links may also be wired Ethernet connections, such as in a location have a wired infrastructure.

§ 2.0 Access Point

Figures 3, 4:
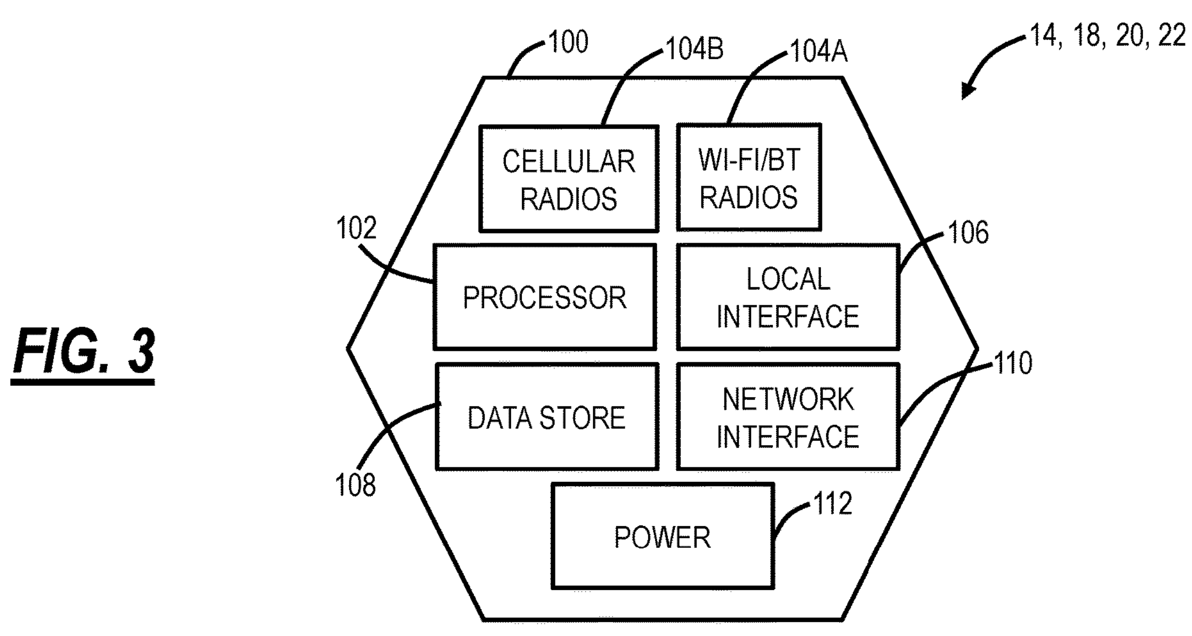
FIG. 3 is a block diagram of functional components of the access points, mesh nodes, repeaters, etc., in the Wi-Fi networks of FIG. 1.
FIG. 4 is a block diagram of functional components of a server, a Wi-Fi client device, or a user device that may be used with the Wi-Fi network of FIG. 1 and/or the cloud-based control of FIG. 3.

FIG. 3 is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3 depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104S can operate according to the IEEE 802.11 standard. The radios 104B support cellular connectivity such as Long Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104S such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access.

Also, the radios 104A, 104B include antennas designed to fit in the form factor 100. An example is described in commonly-assigned U.S. patent Ser. No. 17/857,377, entitled "Highly isolated and barely separated antennas integrated with noise free RF-transparent Printed Circuit Board (PCB) for enhanced radiated sensitivity," filed Jul. 5, 2022, the contents of which are incorporated by reference in their entirety.

The local interface 106 is configured for local communication to the node and can be either a wired connection or wireless connection such as Bluetooth or the like. Since the node can be configured via the cloud service 40, an onboarding process is required to first establish connectivity for a newly turned on node. In an embodiment, the node can also include the local interface 106 allowing connectivity to a Wi-Fi client device 16 for onboarding to the Wi-Fi network 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 40. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

§ 3.0 Cloud Server and User Device

FIG. 4 is a block diagram of functional components of a server 200, a Wi-Fi client device 16, or a user device that may be used with the Wi-Fi network of FIG. 1 or 2B, and/or the cloud-based control of FIG. 2A. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

§ 4.0 Wi-Fi Network with Wired and Wireless Connectivity

Again, the wireless access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 5:
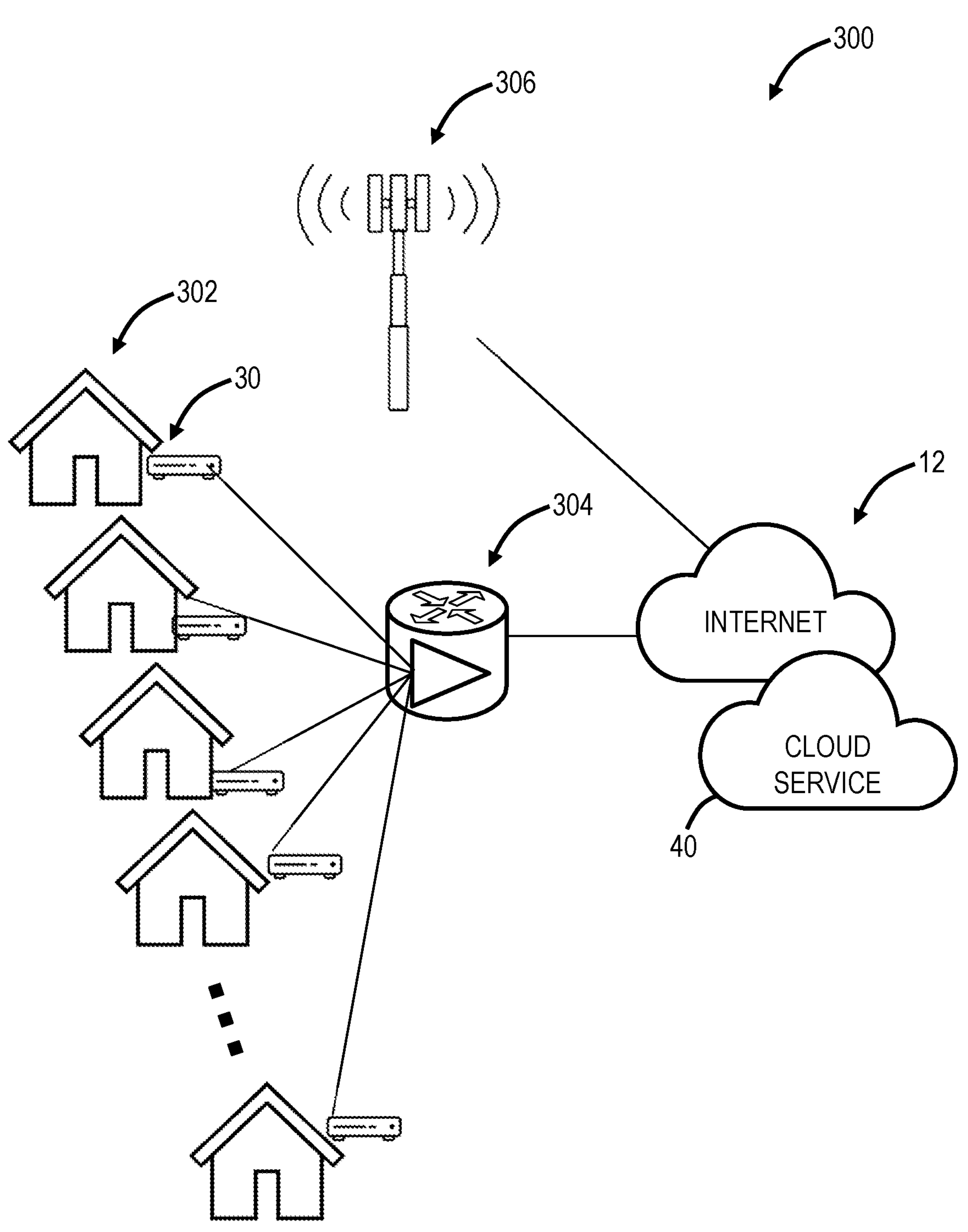
FIG. 5 is a network diagram of a portion of a network associated with a network operator.

FIG. 5 is a network diagram of a portion of a network 300 associated with a network operator. In this example, the network operator includes both wired and wireless broadband in the same geographical area, represented by homes 302. For example, the wired broadband can be via modems/routers 30 that can connect ultimately to a cable modem termination system (CMTS) 304 (or some other type of wired infrastructure, e.g., DSL, Passive Optical Network (PON), Hybrid Fiber Coax (HFC), etc.), and the wireless broadband can be via fixed wireless access via the cellular radios 104B in the access points 14, 18, 22 that connect to a base station 306 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 304 causes a burden on the base station 306 because the wired broadband failure is geographically localized to the homes 302. This could dramatically put a burden on the base station 306 or other cellular cells in the area, leading to degradation of services for all mobile users in the area. That is, wired broadband outages tend to be localized and using wireless broadband for failover could inundate the cellular network.

§ 4.1 Fixed Wireless Access System

Figure 6:
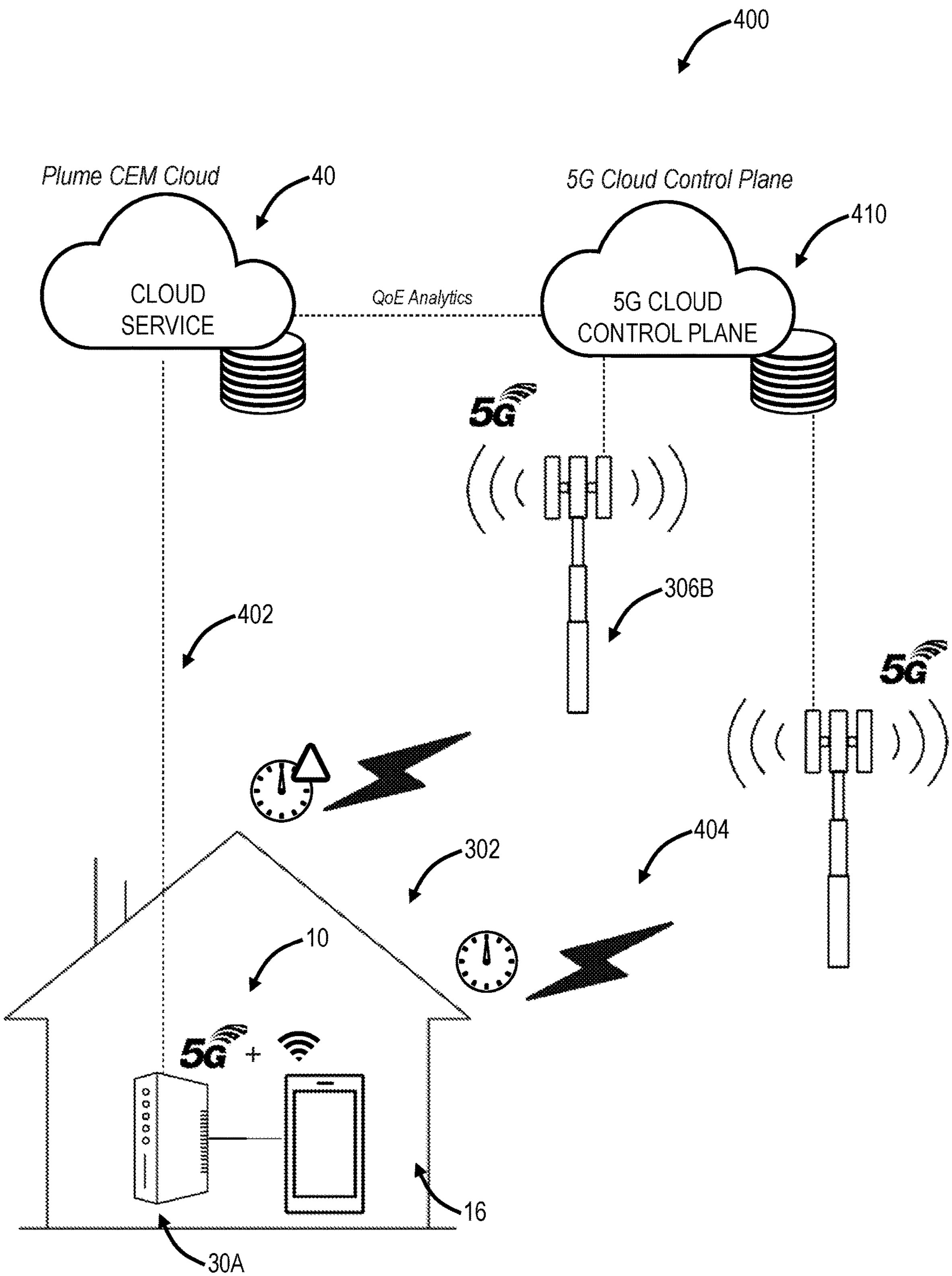
FIG. 6 is a diagram of a fixed wireless access system for wired and/or wireless connectivity.

FIG. 6 is a diagram of a fixed wireless access system 400 for wired and/or wireless connectivity. For illustration purposes, the fixed wireless access system 400 is illustrated with a single home 302 having a modem/router 30 and a Wi-Fi client device 16. Those skilled in the art will recognize the fixed wireless access system 400 contemplates multiple locations, including homes, businesses, store, library, mall, sporting area, or any location where a Wi-Fi network 10 is deployed. Further, the fixed wireless access system 400 contemplates use with various different Wi-Fi networks 10, with various different network operators, etc. Also, the fixed wireless access system 400 contemplates use with any of the various wired and/or wireless connectivity schemes described herein.

The cloud service 40 is configured to connect to the Wi-Fi network 10, either via a wired connection 402 and/or a wireless connection 404. In an embodiment, the cloud service 40 can be utilized for configuration, monitoring, and reporting of the Wi-Fi networks 10 in the homes 302 or other locations. The cloud service 40 can be configured to detect outages such as for the wired connections 402. For example, this functionality is described in commonly-assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 410 and can determine 5G to Wi-Fi quality of experience (QoE) monitoring and application prioritization controls for increased service consistency. QoE analytics can be shared with 5G cloud control plane 410 for network optimization feedback.

In an embodiment, the access points 14, 18, 20, 22 and/or gateway 30A can include OpenSync support for communicating with the cloud service 40.

§ 4.2 Wi-Fi Network Failover to Cellular Connection with Throttling of Traffic In the case where a configuration and reporting is implemented between the home 302 (i.e., gateways 30A) and a central controller or the cloud service 40, the cloud can know, based on reports from the gateways 30A:

1) Which homes have failed over from the wired broadband to the cellular network.

2) Which serving cells are within range of each home gateway—an input received from the mobile operator, or cellular service degradation detected by the home gateways 30A.

In an embodiment, the present disclosure includes failover to the cellular network when there is a failure of wired connections along with throttling of traffic, via the cloud service 40. Specifically, it is undesirable to overload the cellular network; this is particularly true if there is a widescale or regional outage that causes a large number of homes 302 to fail over to cellular in the same region. Also, some cellular plans include pay per data schemes and it would be undesirable for users to get high bills. Further, cellular is typically a lower data rate than the wired connection 402 and it makes sense to throttle to highest priority traffic to preserve real time performance.

Figure 7:
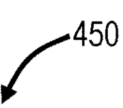
FIG. 7 is a flowchart of a process for Wi-Fi network failover to cellular connection with throttling of traffic.
Figure 7:
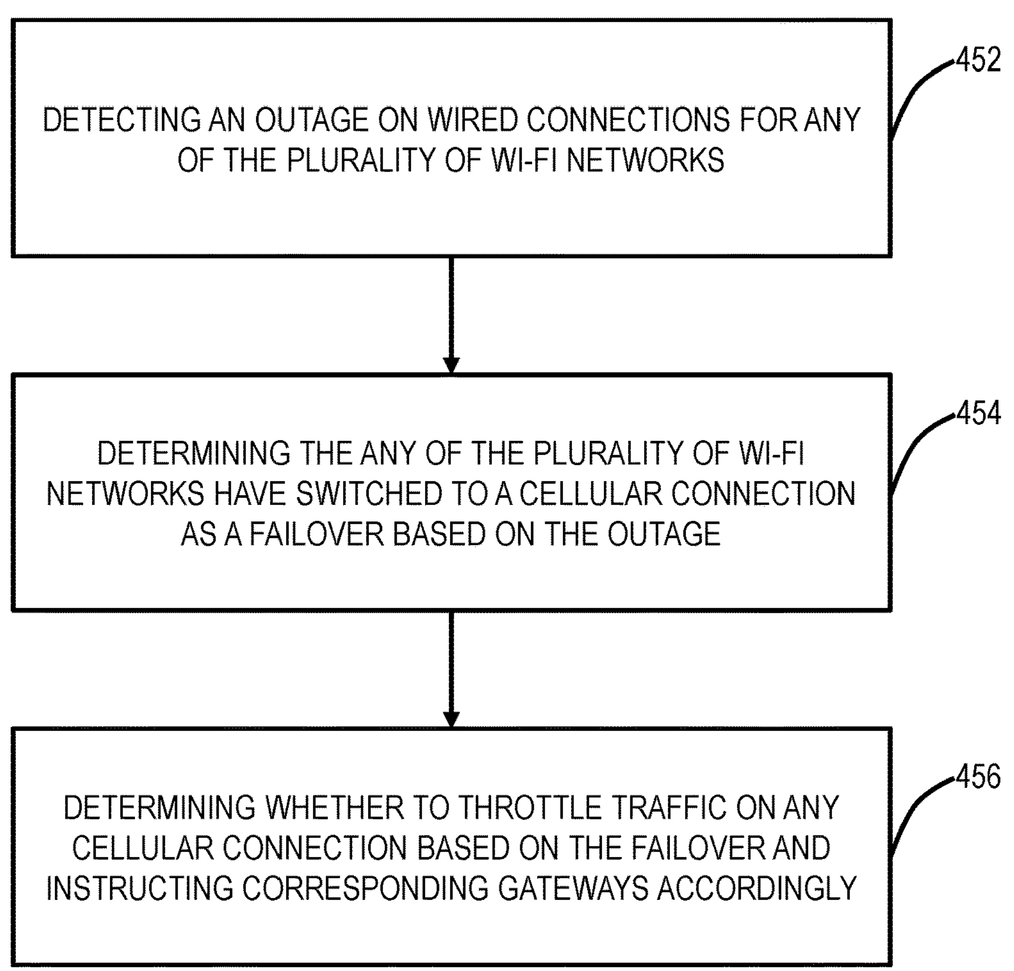

FIG. 7 is a flowchart of a process 450 for Wi-Fi network 10 failover to cellular connection with throttling of traffic. The process 450 contemplates implementation as a method having steps, via a processing device configured to execute the steps, as instructions stored in a non-transitory computer-readable medium, and via the cloud service 40.

The process 450 includes detecting an outage on wired connections for any of the plurality of Wi-Fi networks (step 452); determining the any of the plurality of Wi-Fi networks have switched to a cellular connection as a failover based on the outage (step 454); and determining whether to throttle traffic on any cellular connection based on the failover and instructing corresponding gateways 30A accordingly (step 456).

Again, the cloud service 40 can be connected to multiple Wi-Fi networks 10. The outage can be detected based on the plurality of Wi-Fi networks 10 communicating the wired connections are down. Also, the users can be correlated geographically.

The traffic can be throttled by instructing the gateway 30A accordingly. For example, the access points 14, 18, 20, 22 can be configured to perform the throttling. In an embodiment, the traffic is throttled based on any of specific applications and specific uses. For the application, this includes the Wi-Fi networks 10 identifying the application, such as by packet inspection. The application-based throttling can identify high-priority applications for service (e.g., security monitoring, voice/video conferencing, etc.) as well as penalizing low-priority applications (e.g., data synchronization, entertainment, etc.). Also, the throttling can block specific uses such as system updates, backups, etc. For example, the specific uses can be ones that are not necessarily time critical and can wait for the restoration of the wired connection.

In an embodiment, the traffic can be throttled via a hard cap on how much data can flow through the cellular connection. In another embodiment, the traffic can be throttled by throughput, e.g., Mb/sec. In a further embodiment, the traffic can be throttled based on total data moved. For example, let all applications run until some total amount of data has been transferred and start to throttle after some limit has been reached. The limit could be per period of time, such as an hour, day, week, month, etc.

The traffic can be throttled based on virtual or conceptual local networks that are operational in the plurality of Wi-Fi networks and that have different priorities. This can include discriminating the throttling by different virtual or conceptual, or even actual physical local networks (LANs) based on assigned priorities. For example, throttle only on low-priority networks, such as a guest network or the like. Also, it is possible to prioritize certain networks such as an infrastructure network that is used for high-priority applications.

The throttling can be only under certain circumstances. For example, throttle only when there is a wide area outage, such as more than a certain number of users failover onto cellular. Another approach can include throttling only when the cellular network (infrastructure) indicates to the cloud service 40 that it is overloaded. A further approach can include a cellular device (e.g., the gateway 30A with a cellular connection) indicating that the cell appears to be getting overloaded. A further approach can include throttling applied differently to different users/subscribers depending on the tier of their subscription, Determining whether to throttle traffic can be based on feedback from a cellular control plane to the cloud service. The process 450 can further include steering the corresponding gateways 30A to different base stations to limit a load on any given base station. The process 450 can further include receiving information from the corresponding gateways 30A related to the cellular connection including an identification of a corresponding base station. The process 450 can further include receiving information from the corresponding gateways 30A related to the cellular connection including an identification of visible base stations; and steering the corresponding gateways 30A to different base stations.

In an embodiment, the cloud service 40 can be configured to limit the load on a particular base station, such as by distributing devices. This can be via the fixed wireless access system 400. The cloud service 40 can steer different cellular devices (UEs) to different base stations to limit the load put upon any given base station.

In an embodiment, the cloud service 40 can assign the base station to failover via cell ID beforehand, and this set of assignments could be distributed across all cells/base stations in a given area. In another embodiment, gateways 30A can make their own choice of base station and report to the cloud service 40 where they have connected. The cloud service 40 can then analyze the loads and cause the gateways 30A to move to different base stations as needed to adjust the load. In a further embodiment, there can be a blacklist (preventing connection) and a whitelist (allowing connection) for cells/base stations. This still allows the gateways 30A some flexibility in choosing the cell that works best for it.

In another embodiment, it is possible to have the gateways 30A connect on 4G vs. 5G—as base stations if independent capacity on 4G and 5G for distributing the load across all the resources. This selection should be made intelligently—gateways 30A that need higher throughput should connect on 5G, gateways with lower throughput connect on 4G. That is, the gateways 30A can connect on different bands by having the gateways 30A advertise different band capabilities. All of the above can be programmed before the outage happens, or it could be programmed after the outage starts, as a way to correct an overload on a particular base station. The cloud service 40 can determine overload at a base station without any information from the base station if each gateway 30A reports to the cloud service 40 the amount of data it is moving and which base station, band, and/or technology that it is using.

This process can be aided if the devices (gateways 30A, etc.) report all the base stations they are able to see and could potentially connect to. If the cloud service 40 has collaboration with a cellular carrier, they could provide the cloud service 40 data about the cell loads and utilization, which would help in determining where the gateways 30A should fail over to.

§ 5.0 Installation of Wi-Fi Access Points with Cellular Connection

A gateway 30A that includes the cellular radios 104B ("cellular gateway") will be located indoors, typically. It is important to place the cellular gateway 30A at a good reception area of strong signal strength and quality for better cellular experience (high speed, etc.). The present disclosure includes various approaches for optimizing the location of the cellular gateway 30A. In an embodiment, the present disclosure includes use of a mobile device for estimating signal strength/quality, instead of moving the cellular gateway 30A. In another embodiment, the cellular gateway 30A can be provided with a power bank (e.g., USB-based) to temporarily power the cellular gateway 30A while it is moved around. In a further embodiment, general heuristics can be provided for best practice as to where to locate. Also, in the case where the cellular connection is used as a backup for failover, the cellular gateway 30A does not necessarily have to be the same as the modem/router 30, i.e., the wireless and wired connections can be at different locations.

§ 5.1 Mobile Device as a Sensor

Figure 8:
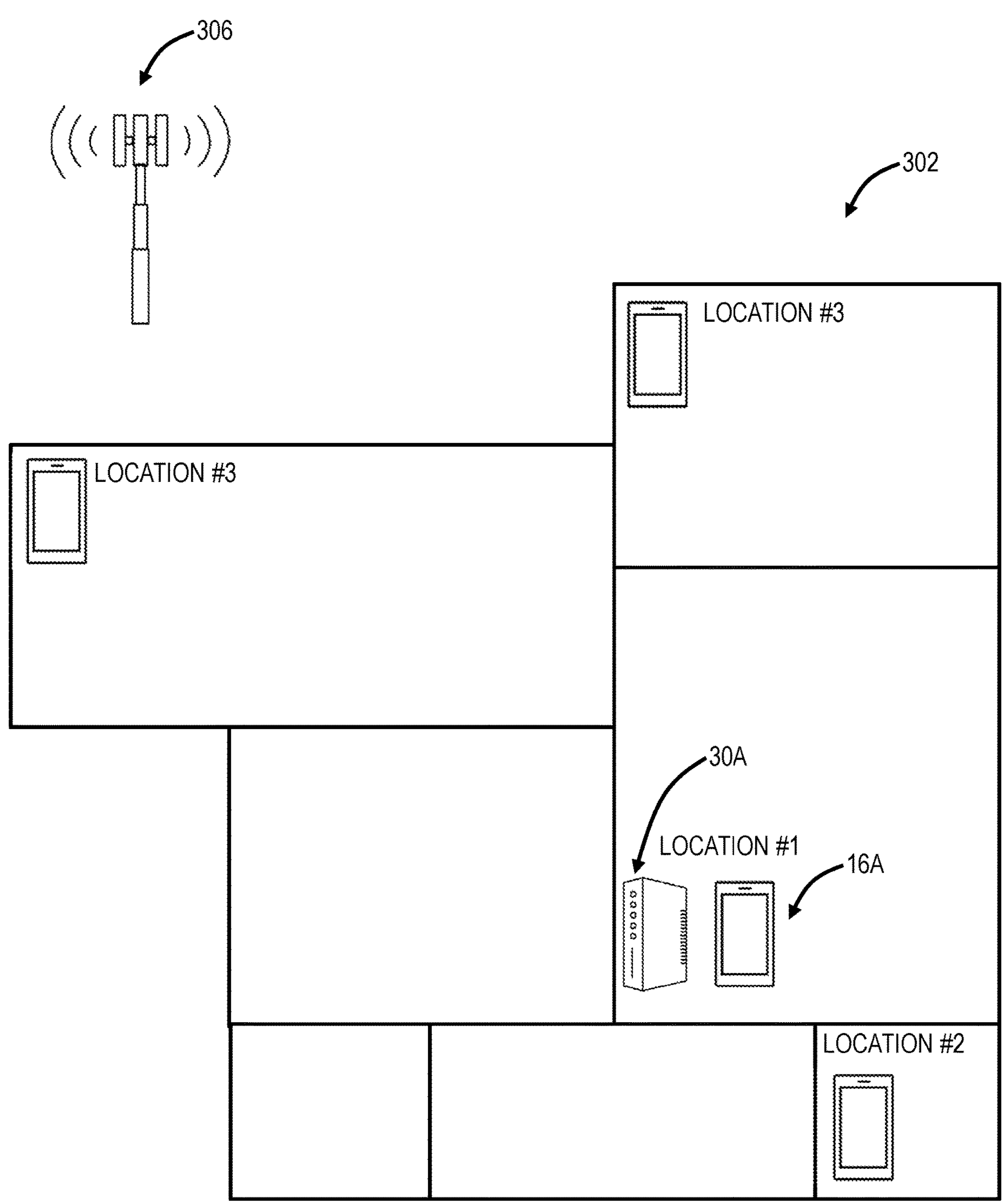
FIG. 8 is a diagram of a house with multiple locations to place the cellular gateway.

In an embodiment, instead of moving the cellular gateway 30A around the home 302 by plugging and unplugging, the idea is to estimate the cellular gateway's 30A signal strength on a customer's mobile device 16A while walking indoor but without moving the cellular gateway 30A. FIG. 8 is a diagram of a house 302 with multiple locations #1-#4 to place the cellular gateway 30A. The requirements to use the mobile device 16A as a sensor include knowing the cellular frequency band and Reference Signal Received Power (RSRP) of the cellular gateway 30A, and the cellular frequency band and Signal Strength (RSRP) of the mobile device 16A which includes a mobile application for operation with the cloud service 40 or a browser session with the cloud service 40.

The objective or output of the sensor is the estimated signal strength (RSRP) of the cellular gateway 30A on the mobile application or browser session while moving around in the home 302 to find the best spot for the cellular gateway's 30A cellular reception. For example, signal strength can be transformed into signal bars or narrative such as excellent, very good, etc. for easy interpretation by a user.

Rural and urban morphology varies the difference in path loss between different frequency bands. If a serving cellular band of the cellular gateway 30A and the mobile device 16A are the same, then the mobile device 16A can be used to find the best spot within the home 302 for the cellular gateway 30A while walking around using signal strength or bars or some other indication. However, there are limitations, outlined in as follows. If serving cellular band of the cellular gateway 30A and the mobile device 16A are different, then by using the delta in path loss between different cellular bands (could be fixed or learned over time), the cellular gateway's 30A signal strength can be estimated using the mobile device's 16A location at various parts of home. If cellular gateway's 30A cellular provider is different from the mobile device 16A cellular service provider, then the estimate can be slightly off because network assets (cellular tower) might be located differently for different cellular carriers around the customer's home 302.

§ 5.2 Delta of Signal Strengths Between Different Bands Using FSL

FSL (free space loss equation) provides a rough estimation as shown below:

| | Cellular gateway | User's mobile device | Delta dB (using FSL) |
|---|---|---|---|
| 1 | 700 MHz | 2100 MHz | 9.54 |
| 2 | 700 MHz | 800 MHz | 1.16 |
| 3 | 700 MHz | 1900 MHz | 8.67 |
| 4 | 700 MHz | 2300 MHz | 10.33 |
| 5 | 700 MHz | 2500 MHz | 11.06 |
| 6 | 700 MHz | 3700 MHz | 14.46 |
| 7 | 700 MHz | 3500 MHz | 13.98 |
| 8 | 700 MHz | 5000 MHz | 17.08 |

Using the above table, first row shows the case where the cellular gateway 30A is camped on 700 MHz (Band 12, 13 or 14) while the mobile device 16A is on 2100 Mhz (Band 4 or 66). Due to propagation differences, the cellular gateway's 30A signal strength can be estimated on the mobile device 16A by adding 9.54 dB to the mobile device's 16A signal strength. While walking around the home, the mobile device's 16A signal strength will vary resulting in varying signal strength for pod as well by ~9.54 dB. The same approach can be used with the other rows.

§ 5.3 Example Operations

If the cellular network carrier for the cellular gateway 30A and the mobile device 16A are same, then there can be two cases based on serving frequency bands of the cellular gateway 30A and the mobile device 16A. With reference to FIG. 8 as an example, assume both the cellular gateway 30A and the mobile device 16A are using the same cellular carrier and connected to the same frequency band. Assume for this case, both the mobile device 16A and the cellular gateway 30A are connected to band 66 AWS/2100 MHz. At location #1, the cellular gateway 30A measures −100 dBm and the mobile device 16A measures −104 dBm. A user walks the mobile device 16A to the location #2 and measures −110 dBm. Next, the user walks the mobile device 16A to the location #3 and measures −100 dBm. Finally, the user walks the mobile device 16A to the location #4 and measures −99 dBm, and a recommendation is provided to move the cellular gateway 30A to the location #4.

For a second case, both the cellular gateway 30A and the mobile device 16A are using the same cellular carrier but connected to different frequency bands. Assume for this case, the cellular gateway 30A is connected to band 66 AWS/2100 MHz while the mobile device 16A is connected to band 12/700 MHz. At location #1, the cellular gateway 30A measures −100 dBm and the mobile device 16A measures −95 dBm. A user walks the mobile device 16A to the location #2 and measures −100 dBm and the cellular gateway 30A is estimated at −105 dBm. Next, the user walks the mobile device 16A to the location #3 and measures −90 dBm and the cellular gateway 30A is estimated at −95 dBm. Finally, the user walks the mobile device 16A to the location #4 and measures −89 dBm and the cellular gateway 30A is estimated at −94 dBm, and a recommendation is provided to move the cellular gateway 30A to the location #4.

However, as mentioned in the limitations above; if the cellular carriers are different as well as their serving cellular towers for the cellular gateway 30A and the mobile device 16A location than it can result in an incorrect recommendation if the cell towers are not collocated. Cellular carriers often share network assets to control cost of cellular tower/site development. In case of tower sharing (co-location) for the nearby cellular asset serving pod and customer's cellphone, either case 1 or case 2 can provide correct recommendation but tower co-location requires tower location identification.

Figures 9, 10:
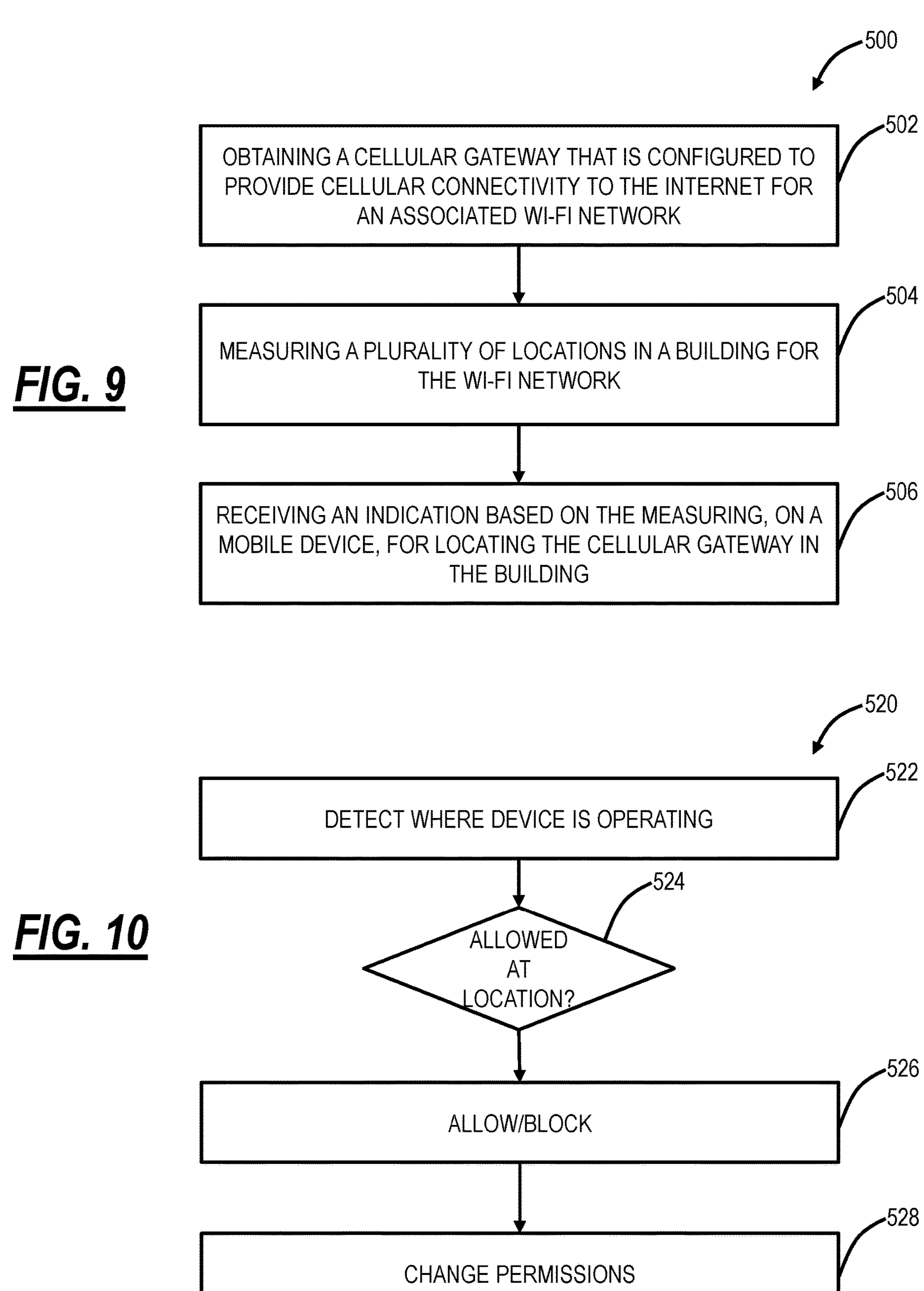
FIG. 9 is a flowchart of a process for installation of a cellular gateway for a Wi-Fi network.
FIG. 10 is a flowchart of a process for geographically limiting a cellular gateway ("device").

§ 5.4 Process for Installation of Wi-Fi Access Points with Cellular Connection FIG. 9 is a flowchart of a process 500 for installation of a cellular gateway 30A for a Wi-Fi network 10. The process 500 includes obtaining a cellular gateway 30A that is configured to provide cellular connectivity to the Internet for an associated Wi-Fi network (step 502); measuring a plurality of locations in a building for the Wi-Fi network (step 504); and receiving an indication based on the measuring, on a mobile device, for locating the cellular gateway in the building (step 506). The measuring can use any metrics for cellular connectivity, i.e., not just signal strength, but also quality or some multi-factor metric The mobile device 16A can execute one of a mobile application and a browser session and communicates with the cellular gateway 30A via any of Bluetooth and Wi-Fi. The mobile application can be associated with the cloud service 40. The mobile device 16A can get information from the cellular gateway 30A, namely a current indication when the cellular gateway 30A is installed. The mobile device 16A can use this in the subsequent measurements as well.

The measuring can be performed by the mobile device 16A configured as a sensor, such that a user physically moves the mobile device 16A to the plurality of locations. That is, it is typically easiest to move the mobile device 16A and it can be used as a sensor. In an embodiment, the cellular connectivity of the cellular gateway and the mobile device are with a same network provider. In an embodiment, the cellular connectivity of the cellular gateway and the mobile device are on different frequency bands with a correction factor used to adjust a measurement by the mobile device to reflect a value for the cellular gateway. In another embodiment, the connectivity can be on the same bands, eliminating the need for the correction factor.

If the mobile device 16A has different band capabilities, but is with the same service provider, then an estimate can be built by deriving a calibration factor by putting the mobile device 16A next to the cellular gateway 30A, and finding the difference in the signal strength as reported by the cellular gateway 30A on the band it wants to operate on, with the signal strength measured on the mobile device 16A in the band that it is operating on. The difference becomes the calibration or correction factor and is applied in a constant way as the mobile device 16A moves about the house. This allows an estimate of the signal strength at any point in the home from the mobile device 16A that more accurately represents what the cellular gateway 30A will achieve when it connects on that band.

In another embodiment, to correct the measurement when the band is different, the default free space path loss calculation can be used to calculate the difference in signal strength between the bands (see the table below). This calculation might also take into account the loss of typical obstructions such as an exterior wall and factor that into the correction factor as well. It also might be possible to determine the correction factor statistically, taking the result from many different cellular gateway 30A or mobile device 16A measurements and comparing the strength of different bands from those measurements.

In an embodiment, the cellular connectivity of the cellular gateway and the mobile device are with a different network provider. Of course, this complicates use of the mobile device 16A as a sensor, e.g., they could be connected to different base stations. If the service or network provider is different between the mobile device 16A and the cellular gateway 30A, the mobile device 16A can sense the other service provider's signal strengths by being forced into roaming mode. The mobile application can force the mobile device 16A to go into roaming through an application programming interface (API). There might be an official command in the API, or it might use some sort of emergency mode to get it to roam. Another approach could include use of the subscriber identity module (SIM) from the cellular gateway 30A in the mobile device 16A so that the mobile device 16A can serve as the sensor when the service provider for the mobile device 16A is different from the service provider for the cellular gateway 30A. The mobile application can instruct the user to do so with detailed instructions.

In another embodiment, the measuring can be done by an installation sensor device which can be a very low-cost handheld battery powered device that reports signal strength, quality, or some multi-factor metric to guide the location of the cellular gateway 30A. This installation sensor device might be returned after the user completes the installation process. Instead of the installation sensor device, the cellular gateway 30A can be configured for powering by a universal serial bus (USB) interface or the like via a battery power bank. This powering can be for full operation or for a sensor mode only for measuring. The battery power bank can be provided with the cellular gateway 30A, obtained separately by the user, or via some device such as a laptop. In the sensor mode, the cellular gateway 30A could only enable enough circuitry to measure and report cellular statistics over Bluetooth or Wi-Fi to the mobile device 16A. Another approach would be for the user to plug the device into their laptop via USB, the laptop then powering the cellular gateway 30A device and potentially serving as the display for the measurements taken, the measurements traveling over the USB connection to the laptop. It is even possible that the same could be done via a USB connection (or a lighting connector) to the mobile device 16A, which would be more convenient to carry about the location together with the cellular gateway 30A. Finally, this connection could be done via wireless charging for a battery on the cellular gateway 30A.

The cellular gateway 30A can further include the wired connectivity to the Internet and the plurality of locations include ones in the building supporting the wired connectivity. Also, the Wi-Fi network 10 can include a plurality of access points with the cellular gateway 30A connected to one access point and a wired gateway connected to a different access point. Here, e.g., the access point with the cellular capability, when the cellular capability is for backup and a wired connection is being used as primary, does not have to be the access point in the home that is connected to the wired connection (broadband modem or gateway with wired connection). In other words, one access point or gateway is connected via wired broadband connection, but a different access point is connected by cellular and can be located anywhere, not constrained to where the broadband access wire is located. Then when the network fails over, it changes which device in the network is the access point out to the broadband.

In an embodiment, the process 500 includes providing results of the measuring to a cloud service. The process 500 can further include utilizing the results by the cloud service for any of analytics, development of heuristics, and providing advice or guidance to users. The cloud service 40 can be configured to build a database based on various measurements. This database can also be used for the following:

- To be aware of what cells are generally strongest in a particular location/neighborhood;
- Which bands are generally strongest in a location/neighborhood;
- Which service provider (carrier) has the strongest/weakest coverage in a particular neighborhood;
- Which service provider has more spectrum, larger carrier aggregation, etc. reflecting that it would have the highest data rates in a particular area;
- To potentially use all the signal strength measurements to triangulate back to where the cell towers are actually located and then would be able to predict coverage into a new neighborhood that has not had any devices in it previously;
- To be used for purposes other than locating the cellular gateway 30A for other customers—perhaps just a generalized metric of coverage.

For example, the cloud service 40 can use data gathered to generate heuristic rules about locating the cellular gateway 30A, and provide that advice to the user through an installation app. The advice might be general such as "place it near a window", or place it near an exterior wall. The advice might be specific to the location: "Place it near a north facing window", which would be derived from having learned from nearby homes that the best cell coverage is coming from the north, or could be derived as a result of the base station triangulation described above, or it could be based on a priori knowledge of where the base stations are located.

§ 6.0 Geographic Limitation of Wi-Fi Access Points with Cellular Connection

The cellular connection with the cellular gateway 30A can be tied to a particular network operator. Also, the cellular gateway 30A can be moved, taken to different locations, etc. That is, the cellular gateway 30A is portable. Network operators may want to lock operation of the cellular gateway 30A to a particular location, i.e., geolocation. This also covers the case where the cellular gateway 30A is resold to a third party, i.e., geolocation control would prevent operation.

Accordingly, in an embodiment, the present disclosure includes various approaches to lock operation of the cellular gateway 30A. That is, prevent operation of the cellular gateway 30A, i.e., 4G or 5G gateway/broadband access device depending on its geographic location. The motivation for this includes the following:

a) blocking a user from selling the device to someone else, and then using it and it's SIM permissions to get onto the network,
b) blocking a user from moving from one place to another and using the device in the new location without contacting or getting permission from the network operator,
c) allowing the network operator to properly limit the density of cellular access users in a given geographic area to make sure the cellular system is not overloaded, and
d) making sure that cellular access is used only in the locations where it is truly needed in the case that a service provider offers both wired and wireless access, and is intending for the wireless access to be used only at the homes/areas where wired access is not conveniently available.

FIG. 10 is a flowchart of a process 520 for geographically limiting a cellular gateway 30A ("device"). There are four general steps including detecting where the device is operating (step 522), determining if the device is allowed to operate in that location (step 524), allowing/blocking the device in that location (step 526), and, optionally, changing permissions for the location of where the device is allowed to operate (step 528). Each is described in detail as follows.

For detecting where the device is operating (step 522), various approaches are contemplated, including approaches implemented at the cellular gateway 30A, information from a user device connected to the cellular gateway 30A, information from the cellular network/infrastructure itself, and combinations thereof. The cellular gateway 30A could include a global positioning satellite (GPS) antenna to determine the location. Further, the cellular gateway 30A can report what base station it is connected to for its location, as well as triangulate with other base stations. A user device includes a GPS antenna and can be used to share its location when it is connected to the cellular gateway 30A via Wi-Fi. Further, the network/infrastructure can include similar techniques as the cellular gateway 30A, namely determining the cellular gateway 30A is connected to a particular base station as well as triangulation. Those skilled in the art will recognize there are various known techniques of geolocation, all of which are contemplated herewith.

Again, the user device 16 can include the application which is used for control of the Wi-Fi network 10 including the cellular gateway 30A. In an embodiment, the user device 16 with the application can connect to the cellular gateway 30A for onboarding, such as via Bluetooth or Wi-Fi. As part of this process, the user device 16 can share its GPS coordinates with the cloud service 40, including via a separate network such as a cellular network in which the user device 16 operates. The assumption here is that the user device 16 must be physically close to the cellular gateway 30A if connected via either Bluetooth or Wi-Fi. When the cellular gateway 30A onboards, the cloud service 40 can provide a list of preferred cell identifiers (IDs). The 5G manager in the cellular gateway 30A can be configured to only allow it to attach to that list of preferred cell IDs, which will restrict it from attaching elsewhere unless it goes through the onboarding process again.

Of note, the detecting can be referred to as geolocating, etc., and the timing of the geolocating can be at onboarding, on demand, and/or periodically on an ongoing basis. As described herein, the cellular gateway 30A is configured to communicate with the cloud service 40 and can share the location thereto. In an embodiment, the cellular gateway 30A can be configured to not operate unless it has shared is location with the cloud service 40 and received approval. If there is cooperation between the cellular network and the cloud service 40, after onboarding the network operator of the cellular network could store information about where the cellular gateway 30A is permitted to attach, including a list of cells, and a geographic specification which could be cross checked if the cellular gateway 30A tries to connect to a cell in a different area.

For determining if the device is allowed to operate in that location (step 524), this can include a check of geolocation and device identifier against a database, such as managed by the cloud service 40. The device identifier can be anything that uniquely identifies the cellular gateway 30A, such as media access control (MAC) address, serial number, and the like. As described previously the preferred cell IDs could be loaded into the cloud service 40 at the time of purchase or configuration, and specification during the purchase of the intended operating location. These preferred cell IDs could come from the network operator, and be loaded into the cloud service 40, and subsequently during onboarding loaded into the cellular gateway 30A.

For allowing/blocking the device in that location (step 526), allowing can be a default option with the blocking being something caused. Alternatively, blocking can be the default option with the allowing being something caused. The action of either blocking or allowing could occur in various locations. First, the action could be in the cellular gateway 30A itself, such as in embedded software/firmware that controls operation of the cellular radio. Second, the action could be implemented by the cloud service 40, including controlling a setting in the cellular gateway 30A. For example, each time a cellular radio from the cellular gateway 30A makes a new connection to the network, there can be a routine that checks to make sure this device is legitimate from a geolocation perspective, and, if not, the cloud service 40 can instruct the cellular gateway 30A to disconnect from the cellular network. Third, the action could be within the cellular network, when a cellular gateway 30A connects or tries to connect, the cellular infrastructure checks if its geolocation or base station selection is acceptable for the action.

Also, blocking could be of the connection itself, i.e., the wireless connection between the cellular gateway 30A and a base station, or it could be of passing traffic, or some hybrid combination. For example, it could be possible to allow a cellular gateway 30A to connect and operate, and then determine it is in the wrong location. When detected in the wrong location, the action can be any of:

a) block data flow while leaving it on the network, b) allow data flow for a period of time while alerting the user through an application notification, email, text message, push notification, etc., of the problem, c) allow data flow for a period of time, but turn it off later, and disconnect the cellular gateway 30A to prevent even the small "idle" load on the network, and/or d) allow the cellular gateway 30A to remain connected to the network, but allow it only to communicate with the cloud service 40 such that management can be applied to it, including seeing things about the cellular gateway 30A if the customer calls for support, or reconfiguring the device to allow connection in the new location.

For, optionally, changing permissions for the location of where the device is allowed to operate (step 528), there may be legitimate reasons to move where the cellular gateway 30A is allowed to operate (the customer is moving, the cellular gateway 30A is being recommissioned to a new customer in a new location, etc.). This can include changing the geolocation information stored in the database for that cellular gateway 30A, i.e., in the cloud service 40. It could also include changing the preferred base station list for the cellular gateway 30A, i.e., in the cloud service 40. The change can include forcing the cellular gateway 30A to go through the onboarding process again—loading a new geo limitation or preferred cell list through the onboarding process. The change can also include forcing it through re-onboarding by "un-claiming" the cellular gateway 30A from the cloud service, at which point it will not be allowed to start up without going through claiming again. In an embodiment, an address update in the cloud service could cause the cellular gateway 30A to be automatically unclaimed.

§ 6.1 Geographic Limitation Process

Figure 11:
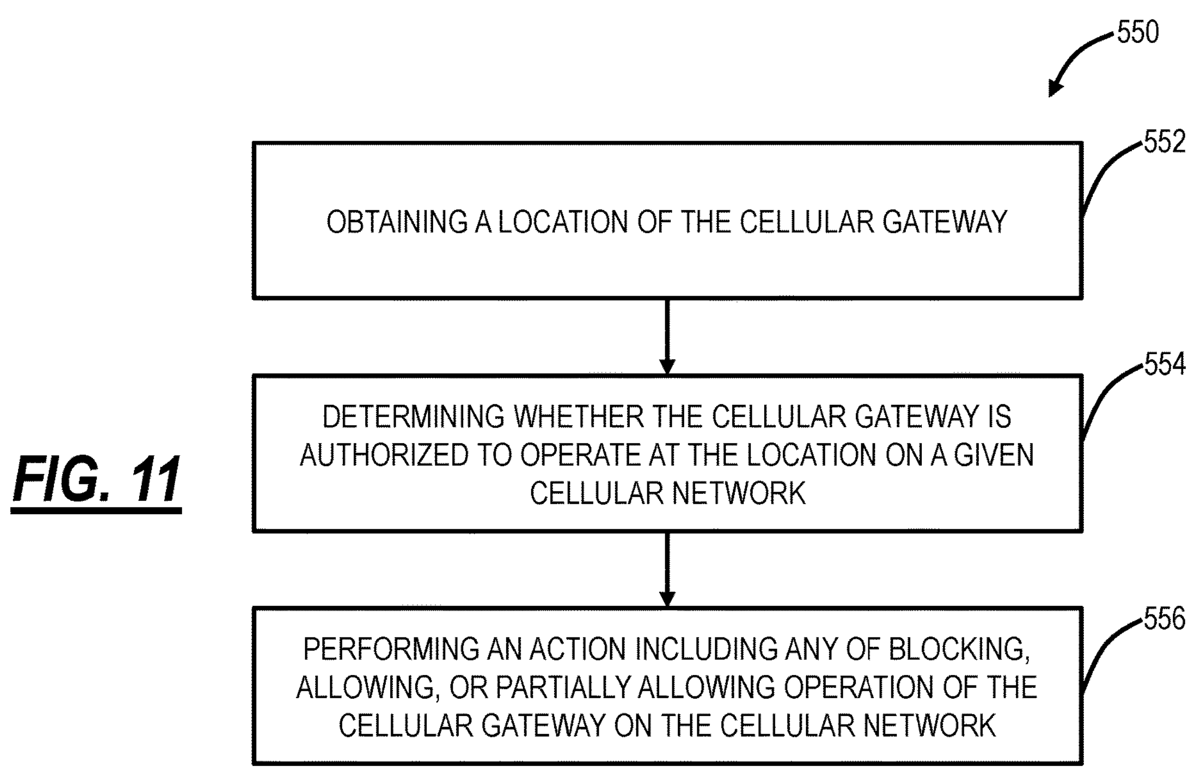
FIG. 11 is a flowchart of a process of geographically limiting a cellular gateway for a Wi-Fi network.

FIG. 11 is a flowchart of a process 550 of geographically limiting a cellular gateway for a Wi-Fi network. The process 550 contemplates implementation as a method having steps, via a processing device configured to execute the steps, as instructions stored in a non-transitory computer-readable medium, and via the cloud service 40. The process 500 includes obtaining a location of the cellular gateway (step 552); determining whether the cellular gateway is authorized to operate at the location on a given cellular network (step 554); and performing an action including any of blocking, allowing, or partially allowing operation of the cellular gateway on the cellular network (step 556).

The process 550 can be implemented by a cloud service 40, and wherein the location is determined by one of the cellular gateway and a user device connected to the cellular gateway. The user device can be configured to provide the location to the cloud service via a separate network from the Wi-Fi network. The location can be determined via a user device connected to the cellular gateway with the user device having a global positioning satellite (GPS) antenna configured to determine the location, and the user device can include one of an application and a browser configured to provide the location. The user device can connect to the cellular gateway via any of Bluetooth and Wi-Fi.'

The location can be determined by cellular infrastructure in the given cellular network. The location can be based on which cellular base station the cellular gateway is connected or based on triangulation via a plurality of cellular base stations. The action can be performed locally at the cellular gateway. The action can be performed in one of a cloud system and the given cellular network.

Whether the cellular gateway is authorized to operate at the location can be based on planning by a network operator. The action can further include allowing temporarily and then blocking, providing a notification of a user of the Wi-Fi network, allowing temporarily and then disconnecting the cellular gateway, allowing temporarily and then only allowing the cellular gateway to communicate with a cloud service, and only allowing the cellular gateway to communicate with a cloud service.

§ 7.0 Selecting and Controlling Base Stations Ffr Wi-Fi Access Points with Cellular Connection The foregoing approach limited the geolocation of the cellular gateway 30A and this serves as one way to monitor and plan for data usage on the cellular network. However, a particular cellular gateway 30A can be allowed at a specific location, but may connect to various different base stations. There is a need to further limit the connectivity to provide the network operator more granularity in planning. That is, a network operator may want to direct a particular cellular gateway 30A to a particular base station 306 based on a plurality of factors, including, e.g., bandwidth, congestion, performance, signal strength and quality, as well as other factors.

Figure 12:
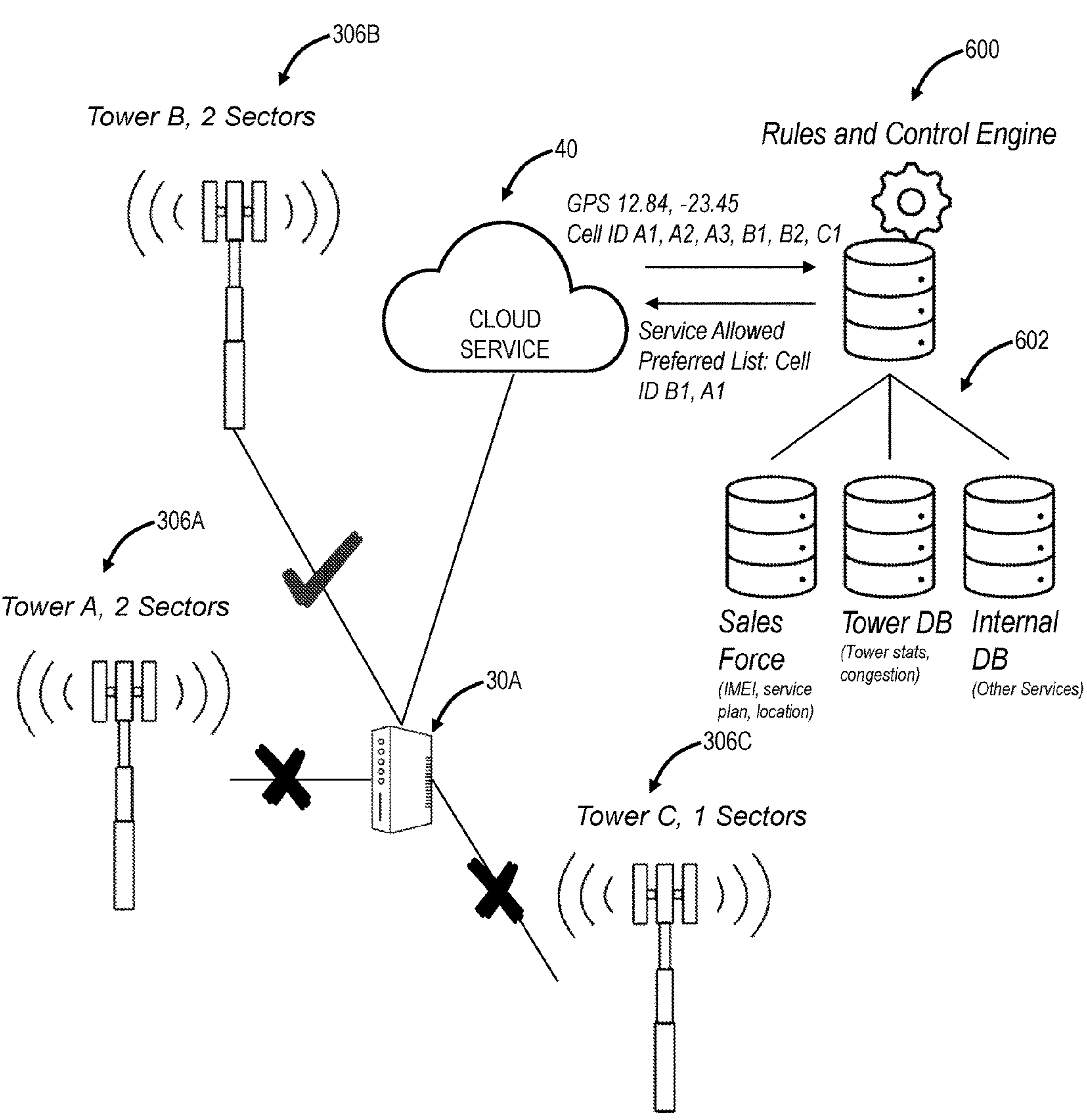
FIG. 12 is a network diagram of a cellular gateway that is connected to the cloud service and able to connect to multiple base stations.

FIG. 12 is a network diagram of a cellular gateway 30A that is connected to the cloud service 40 and able to connect to multiple base stations 306A, 306B, 306C. The cloud service 40 can connect to or include a rules and control engine 600 that is communicatively coupled to various databases associated with a cellular network, e.g., a salesforce database with International Mobile Equipment Identity (IMEI), service plan information, locations, etc.; a tower database with statistics, congestion information; and other database for various services associated with the cellular network. The cloud service 40 can be configured to generate custom rules per user equipment (UE) based on cell IDs detected, rules can be set in the cloud service 40 and applied automatically when the cellular gateway 30A connects, and there can be real time changes in preferred list required based on cell congestion. That is, there can be real time collaboration between the cloud service 40 and the cellular network for determining which base stations 306 for a particular cellular gateway 30A.

In an embodiment, the cloud service 40 can use information 602 from the cellular infrastructure for directing cellular gateway 30A connectivity, such as via a cell ID list, based on:

a) available bandwidth in the geographic location of the cellular gateway 30A.
b) network congestion in the location of the cellular gateway 30A.
c) network performance in the location of cellular CPE.

The cellular gateway 30A can provide its location (GPS) and the base stations 306 that it can connect to. The cloud service 40 can provide a preferred list of base stations 306 to the cellular gateway 30A.

The cellular gateway 30A can connect to preferred cell IDs (base stations 306) stored in the cloud service 40 or locally. These preferred cell IDs can be from the information 602. The cloud service 40 can identify the best serving cell ID from the preferred list using:

a) highest bandwidth to offer.
b) less congestion.
c) stronger signal strength and quality.

If the network information from cellular service provider is limited, the cloud service 40 can trigger some active probe test, by the cellular gateway 30A, to measure and identify the best serving cell id, based on:

a) speed test.
b) latency.
c) jitter.
d) packet loss.

Figure 13:
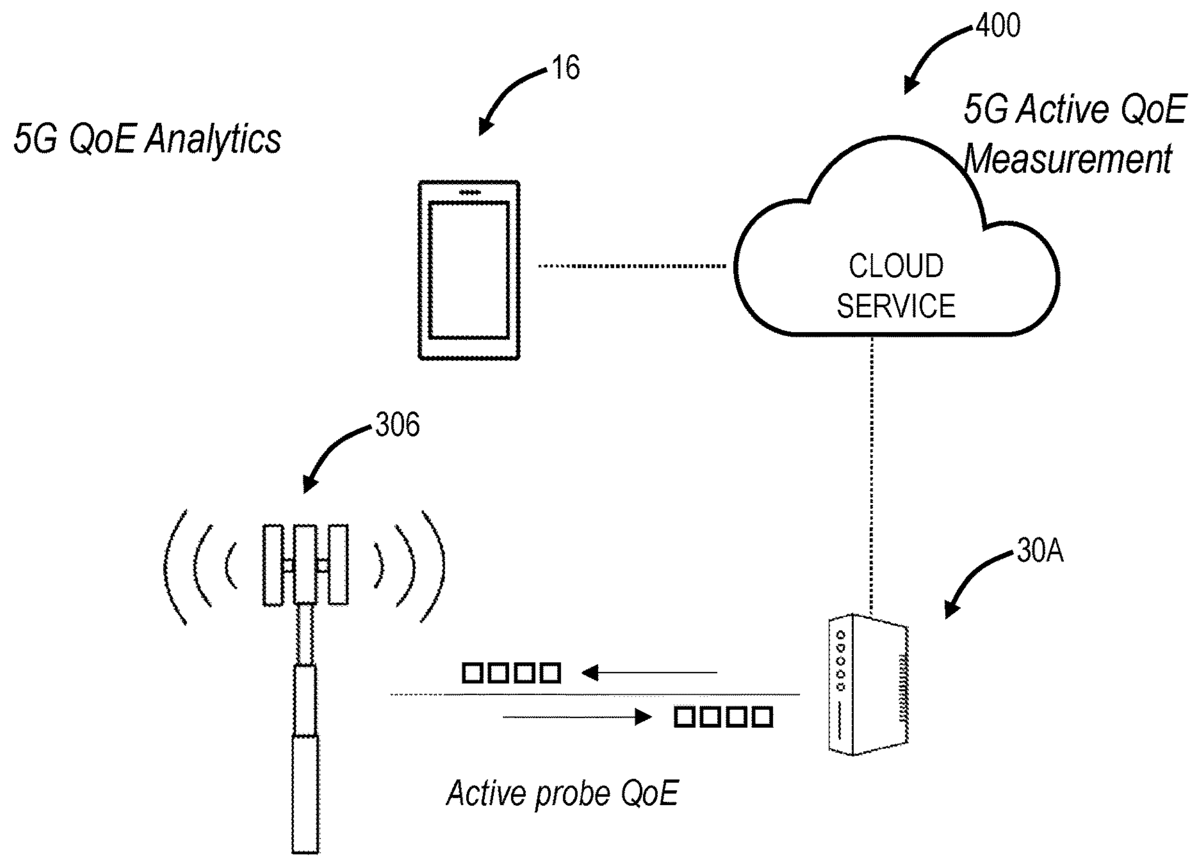
FIG. 13 is a diagram of active probe tests via the cloud service and the cellular gateway.

FIG. 13 is a diagram of active probe tests via the cloud service 40 and the cellular gateway 30A. Of note, the cloud service 40 can communicate a large number of cellular gateways 30A and develop its own measurements, if there is limited information 602 exchange with the cellular network. The cloud service 40 can orchestrate active tests to measure quality of experience (QoE) over time.

Based on the cellular measurement reports, load estimation can be performed by the cloud service 40 using the serving and neighboring cell's measurement reports containing (Reference Signal Received Power) RSRP, (Reference Signal Received Quality) RSRQ, (Signal to Interference and Noise Ratio) SINR and bandwidth. Higher estimation of load would mean network congestion and lower throughput for cellular devices. Cellular CPE collects measurement reports all the time (just like any other cellular device), storing these results and estimating the load will lead to better decision in identifying the best serving cell from load perspective.

Advantageously, the cloud service 40 and/or the cellular service provider can alter the preferred cell IDs based on, e.g.:

a) network congestion (varying traffic trend throughout different hours of the day).
b) maintenance work on the cellular network.
c) network outages.
d) network performance degradation lead to change in preferred cell ID.

Also, after connecting to preferred cell (note, cell includes the base station 306 and a particular sector thereon), the performance of the cellular gateway 30A can be modified by varying techniques such as, e.g.:

a) toggle the technology mode, LTE to 5G, 5G to LTE, 5G non-standalone (NSA) or 5G SA standalone only.
b) client device can request different quality of service (QoS) class identifier (QCI) for better treatment.
c) request different data radio bearers (DRBs) for better performance by requesting various type of traffic demands.
d) manipulating the frequency band serving the cellular gateway 30A based on bandwidth (higher bandwidth leads to higher throughput and so on).
e) manipulating the measurement reports from the cellular gateway 30A to network, such as:

1. Changing the signal strength, which can lead to cell reselection (radio resource control (RRC) idle mode) or handover (RRC connected mode) to different cell id with better performance.
2. Changing the buffer status report, which can lead to higher assignment of resources from cellular network leading to higher throughput and performance.
3. Changing the power headroom report, which can allow the cellular gateway 30A to desired high or low power level for better performance.
4. Changing the multiple input multiple output (MIMO) capability of the cellular gateway 30A to get the desired high performance. For instance, in ideal conditions 4-way MIMO can lead to 4 distinct parallel stream of data resulting in higher throughput and performance.
5. Manipulate the CQI (to force reduction of modulation but allocation of more time which will improve this link at the cost of system capacity). For instance, high CQI (Quality Indicator) results in higher modulation and coding scheme (MCS) usage resulting in better performance.

6. Manipulate the stats reported back to the base station such as the BLER (block error rate).
7. Altering the UE (user Equipment) Capability report to the network by limiting the carrier aggregation (CA) capability to high bandwidth combinations, which will force the network to assign higher CA combination resulting in large resource assignment (better performance: high throughput etc.). UE capability report contains supported LTE and 5G band, LTE and 5G bandwidth, 5G Non-Standalone (NSA), 5G Standalone, LTE and 5G SA carrier aggregation (2way, 3way, 4way etc.), LTE and 5G MIMO capabilities etc.

After connecting to preferred cell, the performance of the cellular gateway 30A can be modified by varying methods such as:

a. Toggle the technology mode, LTE to 5G, 5G to LTE, 5G NSA or 5G SA only
b. Client device can request different QCI for better treatment
c. Request different DRBs for better performance by requesting various type of traffic demands
d. Manipulating the frequency band serving the CPE based on bandwidth (higher bandwidth leads to higher throughput and so on).

§ 7.1 UE-Based Approaches

Again, if the cloud service 40 and the cellular network do not share the information 602, it is possible to use UE measurements, i.e., by a client device 16 that is a UE on the cellular network and/or the cellular gateway 30A as a UE to obtain measurements, to estimate the load at the cell as well as determining which base stations will perform best when connected. There can be various approaches as for an UE to have significant control over how it performs in a network.

§ 7.2 Process for Selecting and Controlling Base Stations

Figures 14, 15:
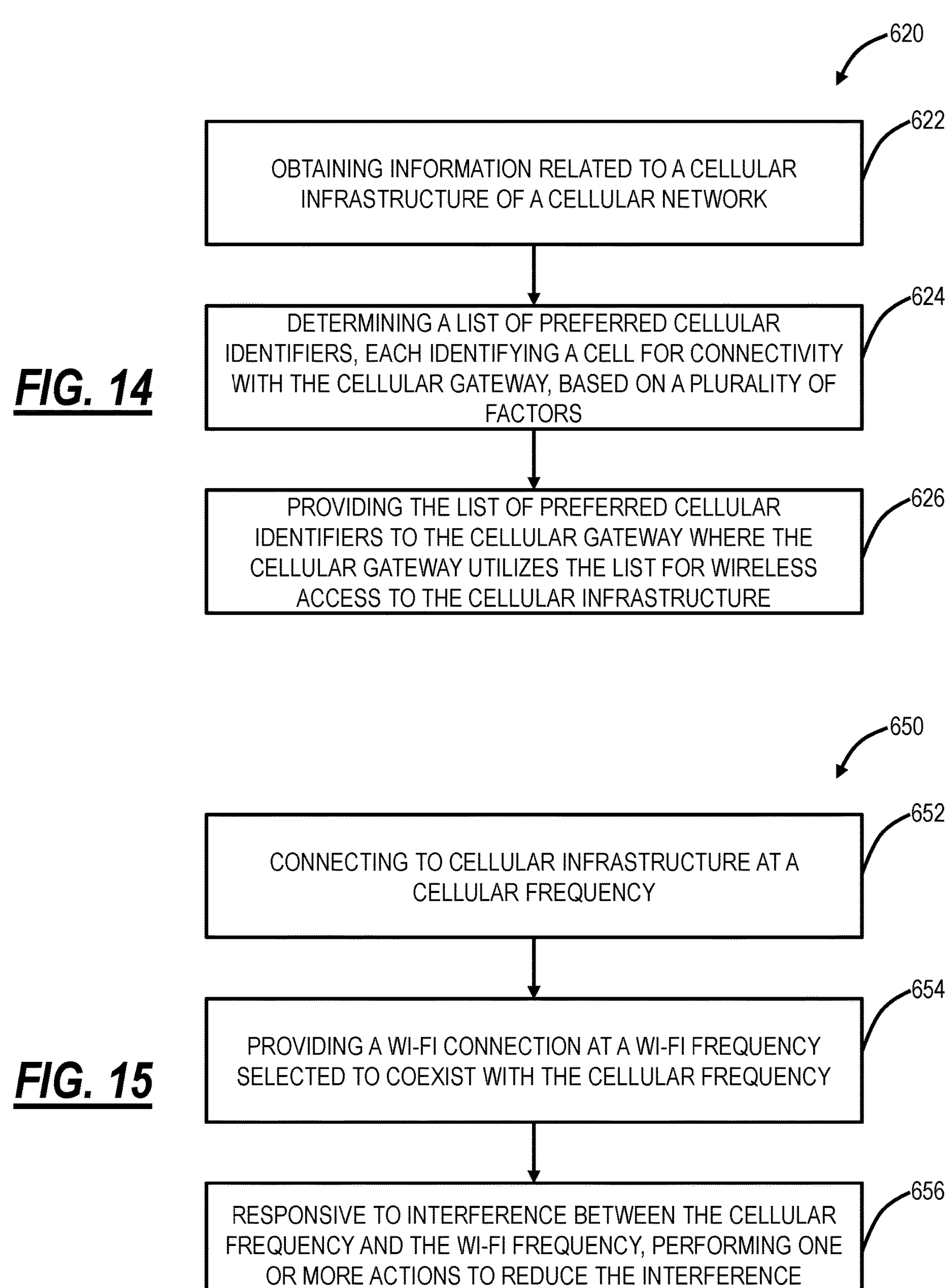
FIG. 14 is flowchart of a process for selecting and controlling base stations for the cellular gateway.
FIG. 15 is a flowchart of a process for frequency planning for a cellular gateway in a Wi-Fi network.

FIG. 14 is flowchart of a process 620 for selecting and controlling base stations for the cellular gateway 30A. The process 620 contemplates implementation as a method having steps, via a processing device configured to execute the steps, as instructions stored in a non-transitory computer-readable medium, and via the cloud service 40. The process 620 includes obtaining information related to a cellular infrastructure of a cellular network (step 622); determining a list of preferred cellular identifiers, each identifying a cell for connectivity with the cellular gateway, based on a plurality of factors (step 624); and providing the list of preferred cellular identifiers to the cellular gateway where the cellular gateway utilizes the list for wireless access to the cellular infrastructure (step 626).

The process 620 can further include periodically updating the list of preferred cellular identifiers and providing to the cellular gateway, based on changes in any of the plurality of factors. The plurality of factors can include available bandwidth in the cellular infrastructure, network congestion, network performance, maintenance work on the cellular infrastructure, and network outages. The information can be obtained from one or more databases managed by a network operator of the cellular network.

The obtaining can include triggering active probe tests by the cellular gateway including any of speed tests, latency measurements, jitter measurements, and packet loss measurements. The obtaining can include consolidating results of the active probe tests with results from other devices; and determining load on the cellular infrastructure based on the consolidated results.

The process 620 can further include, subsequent to the cellular gateway connecting to a preferred cell, causing modification of a connection between the cellular gateway and the preferred cell, for improvement of the connection. The modification can include any of changing signal strength, changing a buffer status report, changing a power headroom report, and changing multiple input multiple output of the cellular gateway. The modification can include any of manipulating quality of service (QoS) class identifier, manipulating statistics from the cellular gateway, and altering a capability report from the cellular gateway.

§ 8.0 Frequency Planning for Wi-Fi Access Points with Cellular Connection

Of note, the cellular gateway 30A supports Wi-Fi at 2.4 GHz, 5 GHz, and 6 GHz, along with cellular at various frequencies, and there is a need to ensure Wi-Fi/cellular channel pairs work well together (and conversely to avoid Wi-Fi/cellular channel pairs that work badly together). Various approaches are contemplated including:

a) performing measurements in a lab and/or in the field about which frequency pairings work well or badly.
b) utilizing field data (statistical data), in the cloud service 40, to identify frequency pairings that work well or badly.
c) blocking use of any frequency pairings that work badly or weighing frequency pairings that work badly with higher weights in an optimization that selects Wi-Fi channels. That weighting factor could be set in an "analog/continuous" way depending on how well or poorly a particular pairing works.

Of note, in an embodiment, bad frequency pairings can be resolved only by adjusting the selected Wi-Fi channel as opposed to changing anything about cellular system. This is because there is more control of the Wi-Fi network 10 by the cloud service 40. The Wi-Fi network 10 has several channels to choose from that all work basically identically. On the contrary, cellular channel selected is largely controlled by cellular infrastructure (base stations 306). Also, transmit power of the Wi-Fi signals could be changed to reduce the amount of interference going into the cellular signal, as well as manipulating the use of a modulation coding scheme (MCS) to force a lower rate (simpler and more robust modulation format) on the Wi-Fi so that it is more robust to cellular interference.

In another embodiment, it is possible to manipulate the cellular channel in use by the cellular gateway 30A. This can include the cloud service 40 interacting with cellular infrastructure to make request of certain channels that should be used or avoided, e.g., this can be part of the preferred cell ID list. Also, from the cellular client side (cellular gateway 30A), it is possible to manipulate the list of channels that are supported. The cellular gateway 30A can deny operating in an entire band if that band is problematic. Also, the cellular gateway 30A can steer itself to a different tower, cell, or base station 306 that may be operating on a different channel. Further, the cellular gateway 30A can potentially manipulate things such that you can use a particular band only in uplink or downlink. This may be helpful as the interference problem may be primarily on uplink or downlink traffic but not both. It is possible to manipulate the transmit power of the cellular gateway 30A in the cellular band so as to minimize interference. Further, it is possible to manipulate the channel quality indicator (CQ) report to force a lower rate (simpler and more robust modulation format) on the cellular so that it is more robust to Wi-Fi interference.

In another embodiment, it is possible to avoid interference by adjusting the times of transmissions or reception on the Wi-Fi or the cellular side so as to avoid simultaneous transmissions or receptions. One approach can include using time division multiple access (TDMA) modes in the Wi-Fi network 10 so as to be able to schedule the following transmissions: orthogonal frequency-division multiple access (OFMDA), resource unit (RU) reservation (network slicing), etc. On the cellular side, the UE (cellular gateway 30A) has little control over time slot allocations, so it may be difficult to control from the cellular client. On the cellular side, it is possible to communicate with cellular infrastructure which time slots or time slot pattern that the cellular device wants to use so that this type of time-based interference avoidance can be used.

Another approach can include manipulation of the listen before talk threshold (e.g., carrier-sense multiple access (CSMA) threshold, clear channel assessment (CCA) threshold) to make the Wi-Fi transmissions defer (not transmit) while the cellular is active and therefore putting interference into the Wi-Fi channel. This threshold could be manipulated based on information from the cloud service 40 or local sensing.

Request to send (RTS)/clear to send (CTS) could be used by other devices in the Wi-Fi network 10 (say other access points that are connected to the cellular gateway 30A) to ensure that the channel is available and not being interfered by cellular at that particular moment before the main Wi-Fi transmission. This setting could be enforced on the other devices in this network from the cloud service 40 based on which frequency channels are in use and whether interference is expected.

CTS itself can be used to make sure that other devices do not transmit to the cellular gateway 30A at a particular time. The cellular gateway 30A could use this to freeze Wi-Fi communication during the time that cellular is transmitting.

The cellular transmission may have a certain TDMA pattern. In order to ensure that the Wi-Fi transmission can fit into the gaps in the cellular transmissions, it may be desirable to limit the length of the Wi-Fi transmission by manipulating the aggregated media access control (MAC) protocol data unit (AMPDU) length (number of bytes being sent in a single packet).

Any of the above approaches (frequency channel, power level, TDMA slot, MCS manipulations) can be used just at the cellular gateway 30A that has cellular and Wi-Fi in the same device (close proximity). At the other access points in the Wi-Fi network 10, there may be no problem with simultaneous operation of Wi-Fi and cellular (due to the physical distance) so the other access points might be able to use the problematic frequency channels, or may not need to use any of the other mitigation techniques. Because the problem may only exist at the cellular gateway 30A, it may be beneficial when interference is going to occur to steer clients 16 away from the cellular gateway 30A and to the access points that do not have cellular in them. At the cellular gateway 30A, 5 GHz (and 6 GHz) capable clients could be steered from 2.4 GHz to 5 GHz (or 6 GHz) to avoid interference with the cellular band.

It is also possible to manipulate cellular channel in use, such as:

a. Interact with cellular infrastructure and make request of certain channels that should be used or avoided
b. From the cellular client side (UE or GW), we manipulate the list of channels that we support.
c. Cellular client can deny operating in an entire band if that band is problematic
d. Cellular client can steer itself to a different tower that may be operating on a different channel
e. Cellular client can potentially manipulate things such that you can use a particular band only in uplink or downlink. This may be helpful as the interference problem may be primarily on uplink or downlink traffic but not both.
f. Could manipulate the transmit power of the client in the cellular band so as to minimize interference
g. Manipulate the CQI report to force a lower rate (simpler and more robust modulation format) on the cellular so that it is more robust to Wi-Fi interference.

§ 8.1 Process for Frequency Planning for Wi-Fi Access Points with Cellular Connection FIG. 15 is a flowchart of a process 650 for frequency planning for a cellular gateway 30A in a Wi-Fi network 10. The process 650 contemplates implementation as a method having steps, via a processing device configured to execute the steps, as instructions stored in a non-transitory computer-readable medium, and via the cellular gateway 30A. The process 650 includes connecting to cellular infrastructure at a cellular frequency (step 652); providing a Wi-Fi connection at a Wi-Fi frequency selected to coexist with the cellular frequency (step 654); and, responsive to interference between the cellular frequency and the Wi-Fi frequency, performing one or more actions to reduce the interference (step 656).

The Wi-Fi frequency selected to coexist with the cellular frequency can be predetermined based on any of field measurements and lab measurements. The Wi-Fi frequency selected to coexist with the cellular frequency can be determined based on a channel selection process with weighting factors on Wi-Fi frequencies that are based on how well they work with the cellular frequency. The cellular frequency can be fixed and the Wi-Fi frequency can be selected based on the fixed cellular frequency.

The one or more actions can include any of changing a transmit port over the Wi-Fi frequency and changing a modulation coding scheme of Wi-Fi signals over the Wi-Fi frequency. The one or more actions can include interacting with the cellular infrastructure to manipulate the cellular frequency. The one or more actions can include scheduling transmissions over the Wi-Fi frequency to avoid interference with the cellular frequency. The one or more actions can include manipulating listen before talk thresholds on the Wi-Fi frequency to defer transmissions over the Wi-Fi frequency when the cellular frequency is active.

The Wi-Fi network 10 can include the cellular gateway and one or more additional access points. The one or more additional access points can be configured to use request to send (RTS)/clear to send (CTS) to reduce the interference. Wi-Fi clients can be steered to the one or more additional access points from the cellular gateway.

§ 9.0 Conclusion

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:

obtaining a cellular gateway that is configured to provide cellular connectivity to the Internet for an associated Wi-Fi network;

measuring, based on information from the cellular gateway, a plurality of locations in a building for the Wi-Fi network; and receiving an indication based on the measuring, on a mobile device, for locating the cellular gateway in the building related to access to the Wi-Fi network, the cellular connectivity of the cellular gateway and the mobile device are on different frequency bands with a correction factor used to adjust a measurement by the mobile device to reflect a value for the cellular gateway.

2. The method of claim 1, wherein the mobile device executes at least one of a mobile application and a browser session and communicates with the cellular gateway via any of Bluetooth and Wi-Fi.

3. The method of claim 1, wherein the measuring is performed by the mobile device configured as a sensor, such that a user physically moves the mobile device to the plurality of locations.

4. The method of claim 3, wherein the cellular connectivity of the cellular gateway and the mobile device are with a same network provider.

5. The method of claim 3, wherein the cellular connectivity of the cellular gateway and the mobile device are with a different network provider, with the mobile device forced into a roaming mode.

6. The method of claim 3, wherein the cellular connectivity of the cellular gateway and the mobile device are with a different network provider, and further comprising:

replacing a subscriber identity module (SIM) from the cellular gateway into the mobile device, prior to the measuring.

7. The method of claim 1, wherein the measuring is performed by an installation sensor device provided with the cellular gateway.

8. The method of claim 1, wherein the measuring is performed by the cellular gateway with one of a portable power bank and a laptop connected thereto.

9. The method of claim 1, wherein the cellular gateway further includes wired connectivity to the Internet and the plurality of locations include ones in the building supporting the wired connectivity.

10. The method of claim 1, wherein the Wi-Fi network includes a plurality of access points with the cellular gateway connected to one access point and a wired gateway connected to a different access point.

11. The method of claim 1, further comprising:

providing results of the measuring to a cloud service.

12. The method of claim 11, further comprising:

utilizing the results by the cloud service for any of analytics, development of heuristics, and providing advice or guidance to users.

13. The method of claim 1, wherein the mobile device executes one of a mobile application and a browser session, and wherein the indication is provided via the one of the mobile application and the browser session.

14. The method of claim 13, wherein the indication is at least one of bars, a number, and/or a phrase.

15. An apparatus comprising:

one or more processors and memory comprising instructions that, when executed, cause the one or more processors to:

responsive to obtaining a cellular gateway that is configured to provide cellular connectivity to the Internet for an associated Wi-Fi network, measuring, based on information from the cellular gateway, a plurality of locations in a building for the Wi-Fi network; and receiving an indication based on the measuring for locating the cellular gateway in the building related to the apparatus to connected to the Wi-Fi network, the cellular connectivity of the cellular gateway and the apparatus are on different frequency bands with a correction factor used to adjust a measurement by the apparatus to reflect a value for the cellular gateway.

16. The apparatus of claim 15, wherein the apparatus executes at least one of a mobile application and a browser session and communicates with the cellular gateway via any of Bluetooth and Wi-Fi.

17. The apparatus of claim 15, wherein the measuring is performed by the apparatus configured as a sensor, such that a user physically moves the mobile device to the plurality of locations.

18. The apparatus of claim 15, wherein the apparatus is an installation sensor device provided with the cellular gateway.

19. The apparatus of claim 15, wherein the apparatus is the cellular gateway with one of a portable power bank and a laptop connected thereto.

* * * * *